United States Patent

Ikehashi

(10) Patent No.: US 10,072,931 B2
(45) Date of Patent: Sep. 11, 2018

(54) METHOD FOR ACQUIRING ANGULAR VELOCITY OF GYRO SENSOR AND DEVICE FOR DOING THE SAME

(71) Applicant: KABUSHIKI KAISHA TOSHIBA, Minato-ku, Tokyo (JP)

(72) Inventor: Tamio Ikehashi, Yokohama Kanagawa (JP)

(73) Assignee: KABUSHIKI KAISHA TOSHIBA, Tokyo (JP)

( * ) Notice: Subject to any disclaimer, the term of this patent is extended or adjusted under 35 U.S.C. 154(b) by 107 days.

(21) Appl. No.: 14/848,344

(22) Filed: Sep. 9, 2015

(65) Prior Publication Data
US 2016/0298966 A1 Oct. 13, 2016

(30) Foreign Application Priority Data

Apr. 10, 2015 (JP) .................. 2015-081227

(51) Int. Cl.
*G01C 19/56* (2012.01)
*G01P 9/04* (2006.01)
*G01C 19/5726* (2012.01)
*G01C 19/5762* (2012.01)
*G01C 19/5719* (2012.01)

(52) U.S. Cl.
CPC ..... *G01C 19/5726* (2013.01); *G01C 19/5762* (2013.01); *G01C 19/5719* (2013.01)

(58) Field of Classification Search
CPC ............ G01C 19/5726; G01C 19/5755; B81B 7/0016
See application file for complete search history.

(56) References Cited

U.S. PATENT DOCUMENTS

| 6,928,872 B2 | 8/2005 | Durante et al. |
| 8,549,916 B2 | 10/2013 | Sakai et al. |
| 2004/0112133 A1* | 6/2004 | Glenn ................... B81B 3/0051 73/504.12 |
| 2007/0131030 A1 | 6/2007 | Jeong et al. |

(Continued)

FOREIGN PATENT DOCUMENTS

| JP | 2007178298 A | 7/2007 |
| JP | 2013213785 A | 10/2013 |

(Continued)

OTHER PUBLICATIONS

Kazusuke Maenaka, et al., "Design Problems on Vibratory Micro-Gyroscopes", IEEJ Transactions on Sensors and Micromachines, Jul. 1, 1998, vol. 118, No. 7-8, pp. 377-383; and English translation thereof.

*Primary Examiner* — Matthew G Marini
*Assistant Examiner* — Ruben Parco, Jr.
(74) *Attorney, Agent, or Firm* — Holtz, Holtz & Volek PC

(57) ABSTRACT

According to one embodiment, a method of acquiring rotational information of a gyro sensor includes sensing a predetermined physical quantity which depends upon an amplitude of a vibration in a second direction, the vibration in the second direction being based on Coriolis force that is applied to a movable body which is vibrating in a first direction, calculating rotational information of the movable body based on the sensed predetermined physical quantity, and stopping a vibration in the first direction of the movable body after the predetermined physical quantity is sensed.

37 Claims, 27 Drawing Sheets

(56) References Cited

U.S. PATENT DOCUMENTS

2013/0167635 A1 7/2013 Su et al.
2013/0312520 A1* 11/2013 Kho .................. G01C 19/5726
                                                                  73/504.12
2015/0251897 A1* 9/2015 Rastegar ............... B81B 7/0016
                                                                  73/526
2016/0356599 A1* 12/2016 Maul .................... G01C 19/574

FOREIGN PATENT DOCUMENTS

JP          2013234904 A      11/2013
TW           201326750 A       7/2013

* cited by examiner

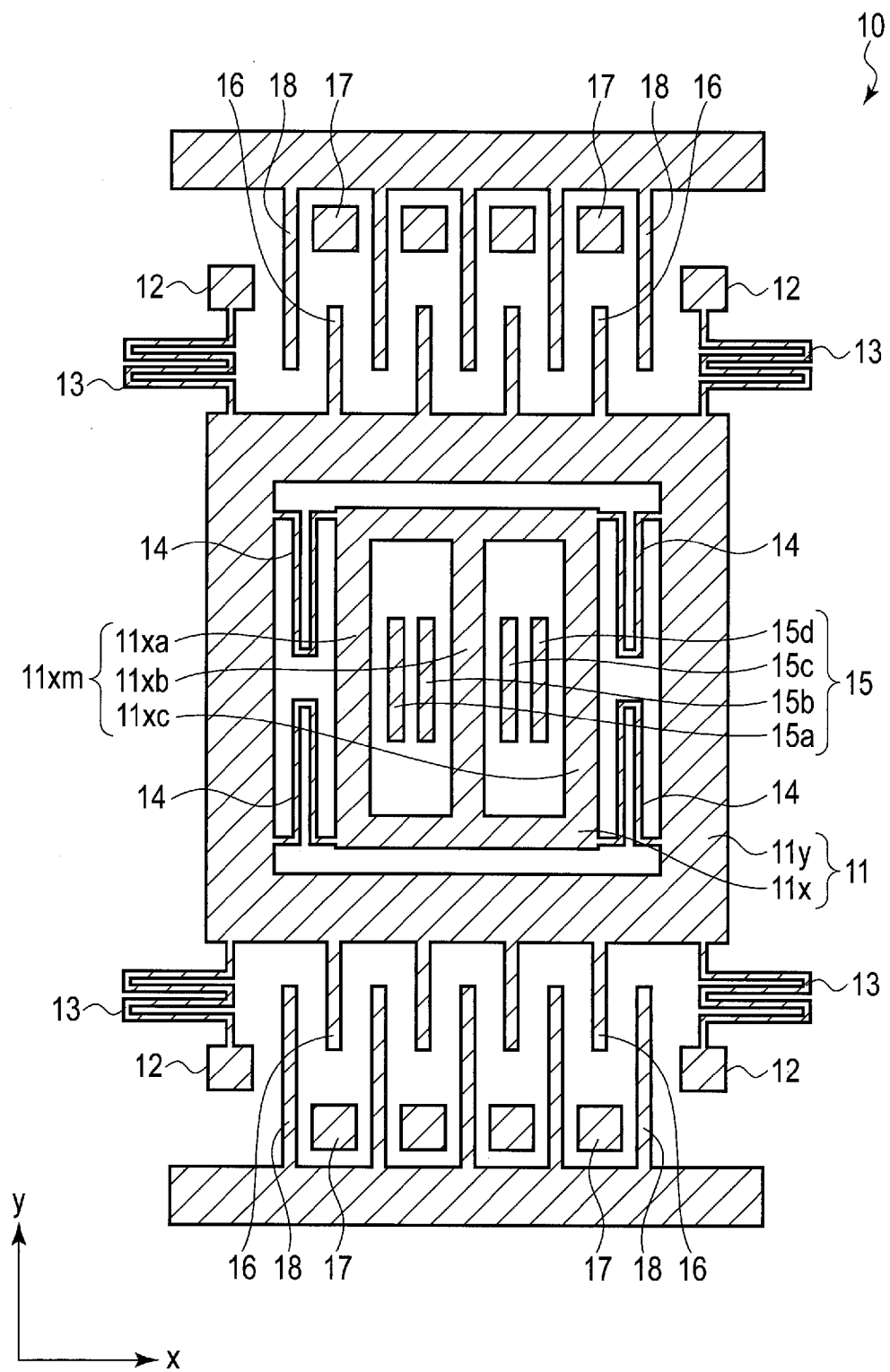
F I G. 1A

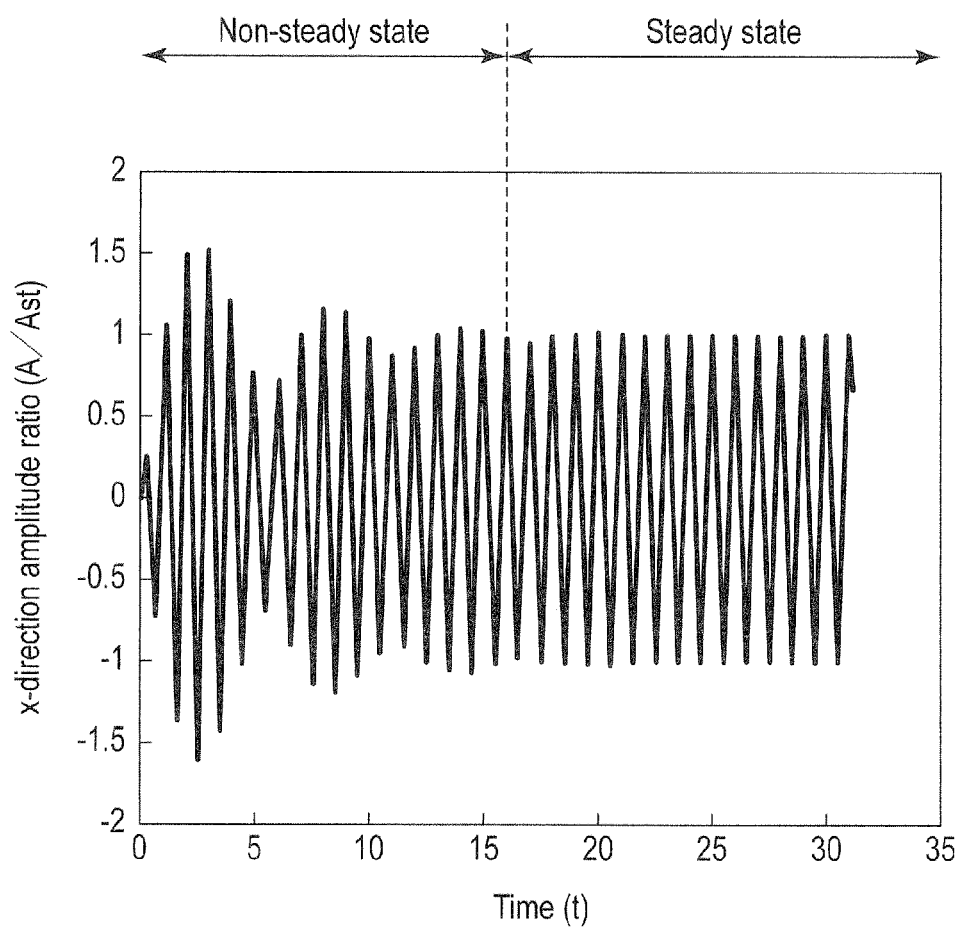
F I G. 2

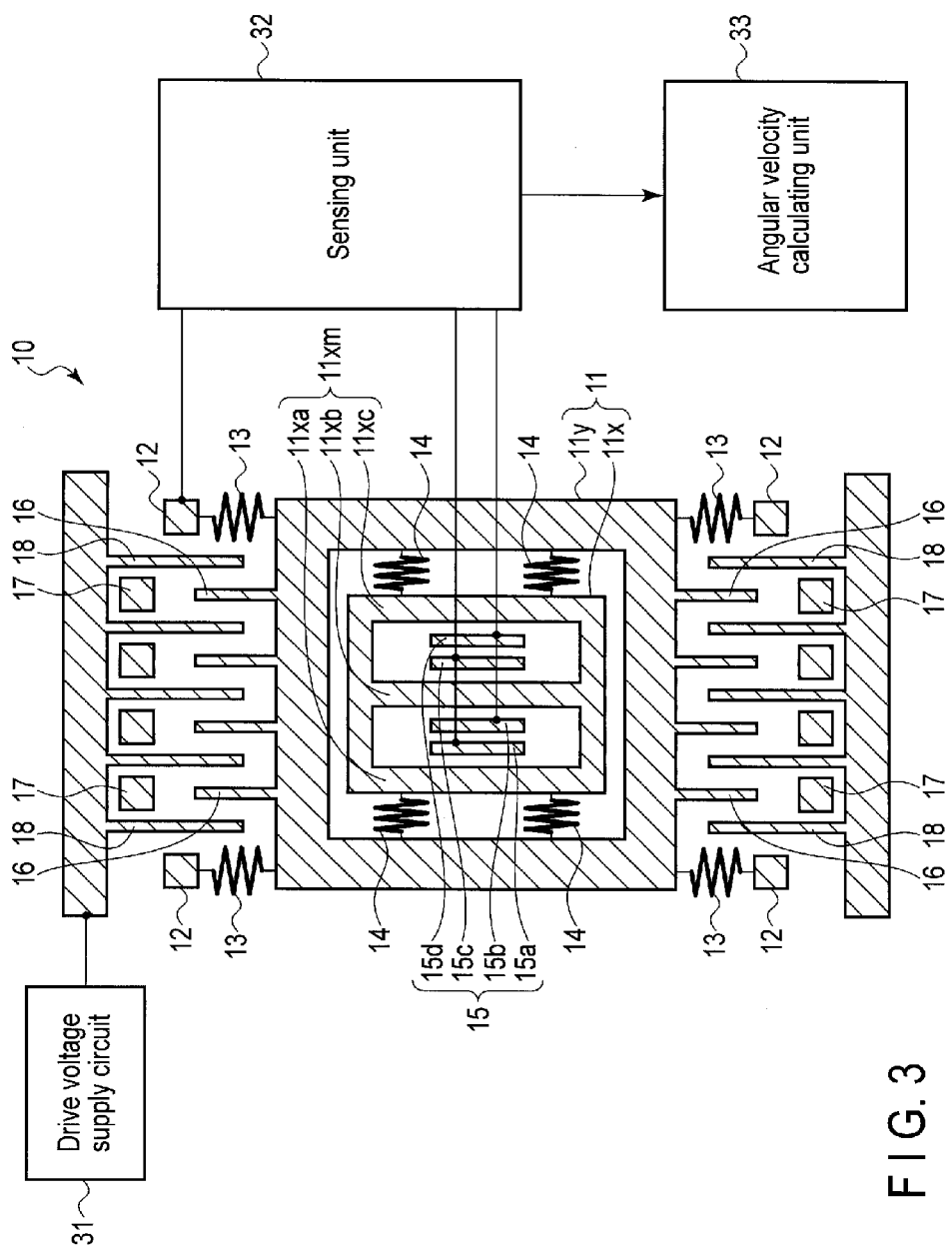
F I G. 3

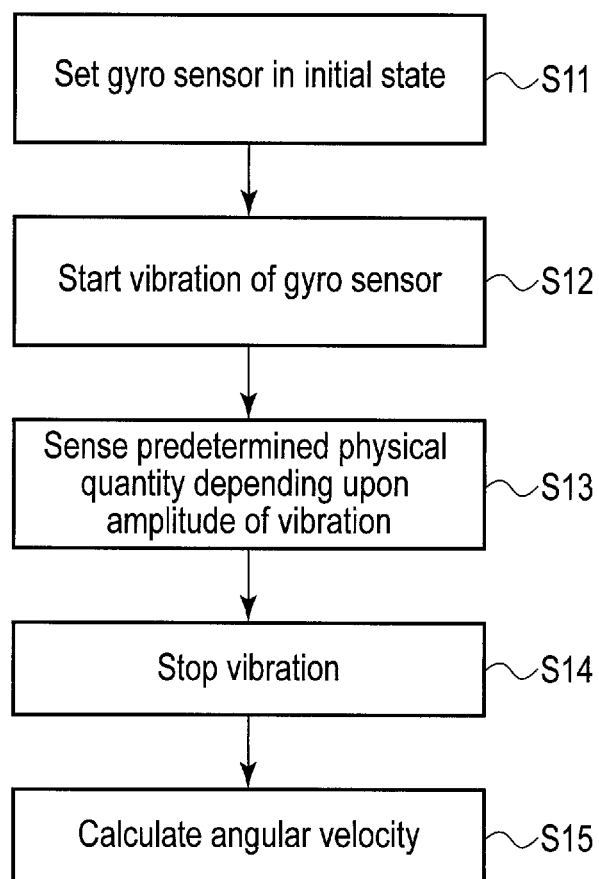
F I G. 4

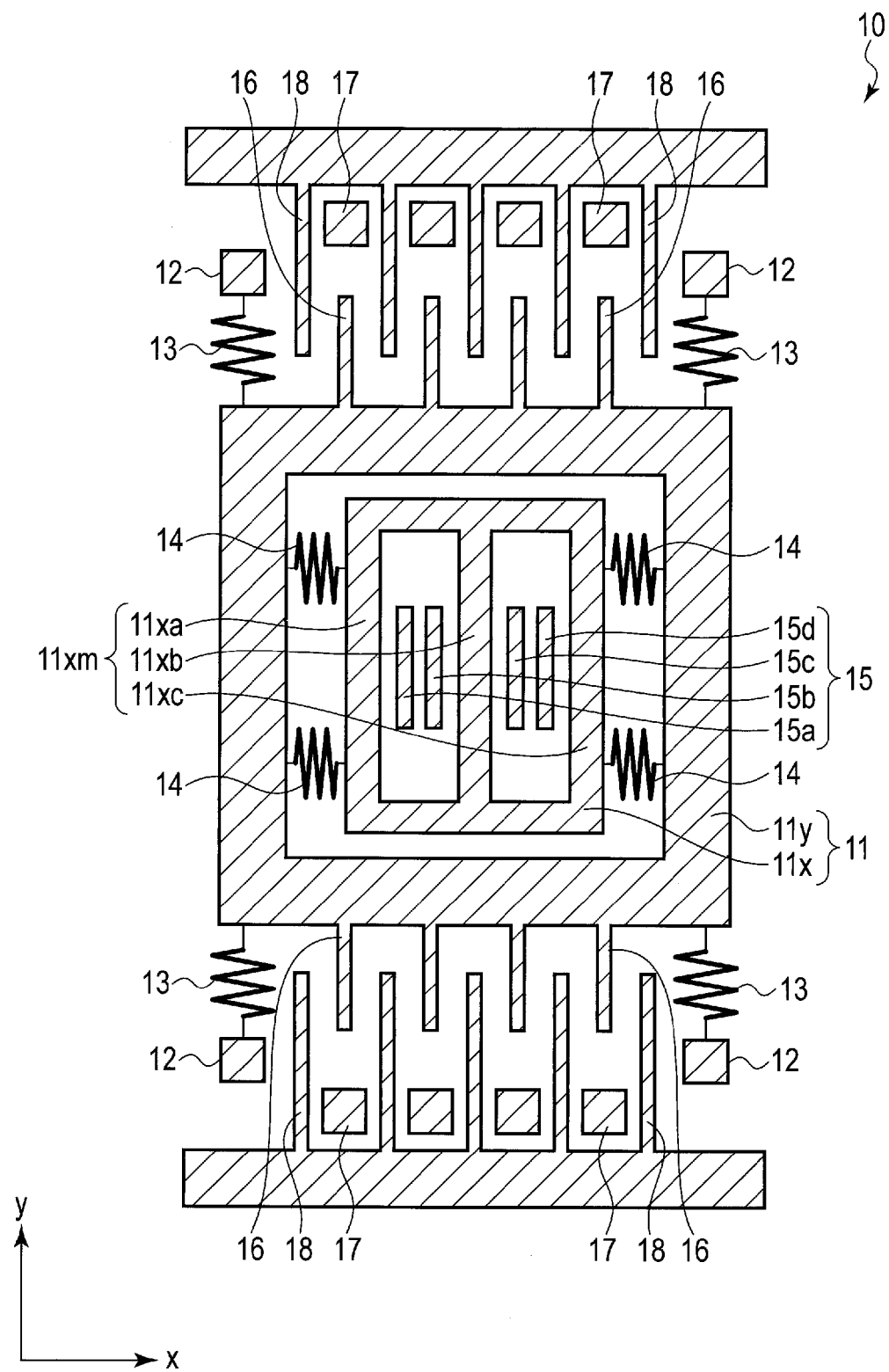
F I G. 5B

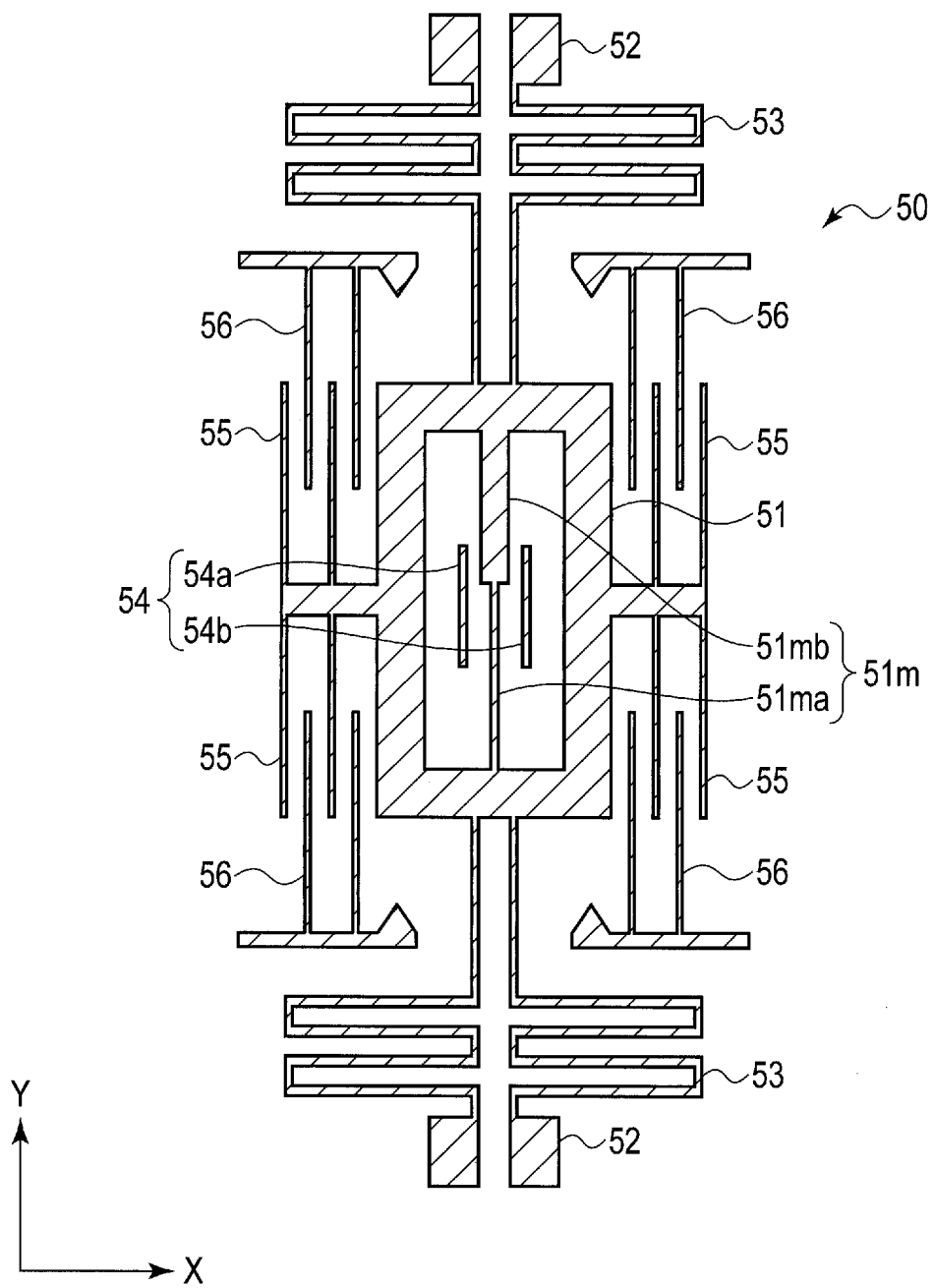
F I G. 6A

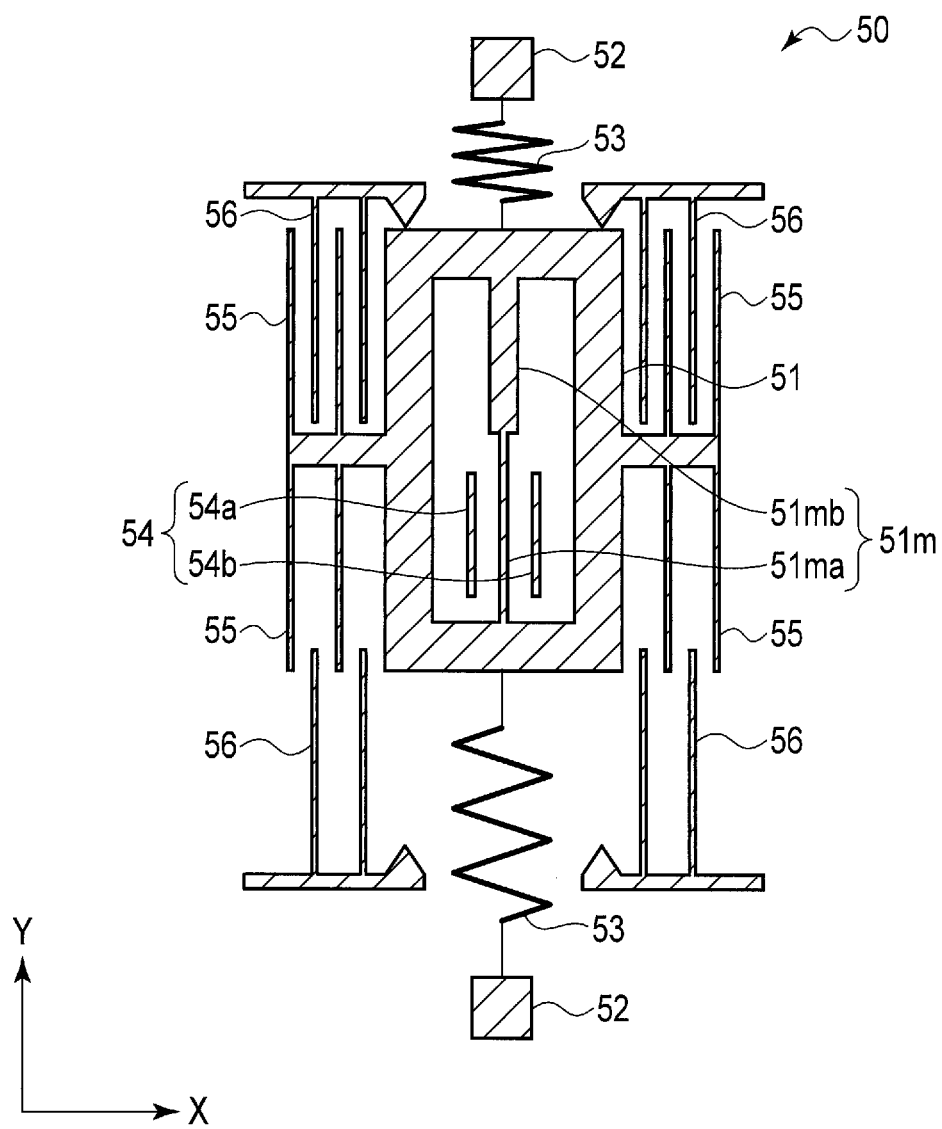
F I G. 6B

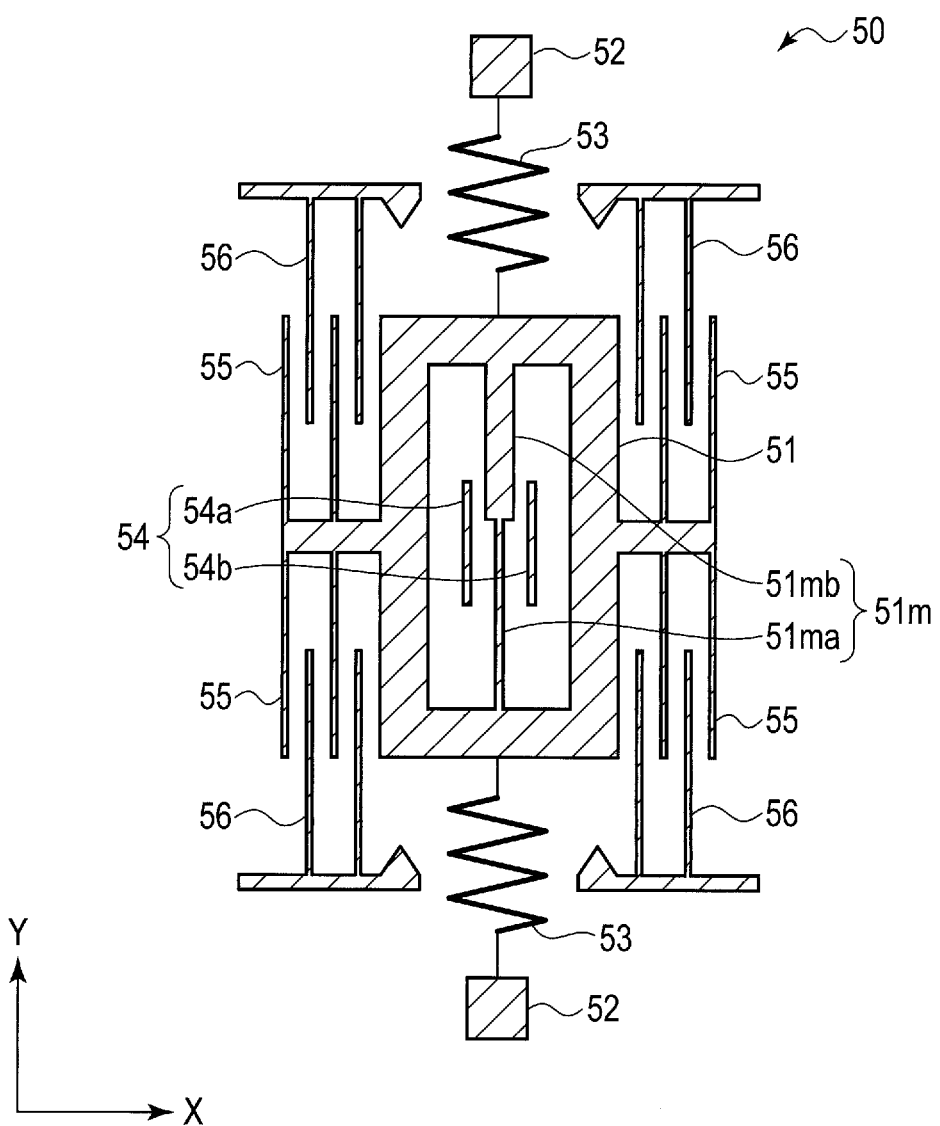
F I G. 6C

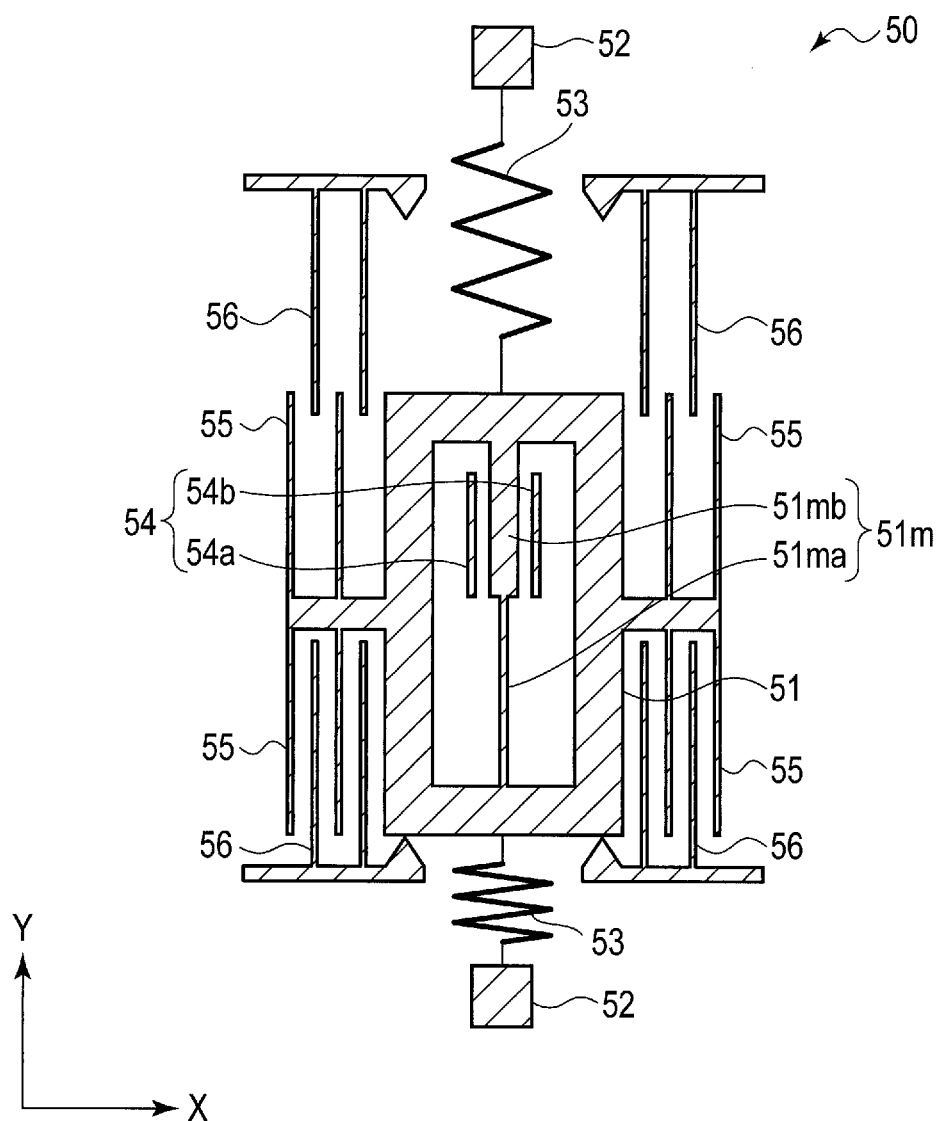
F I G. 6D

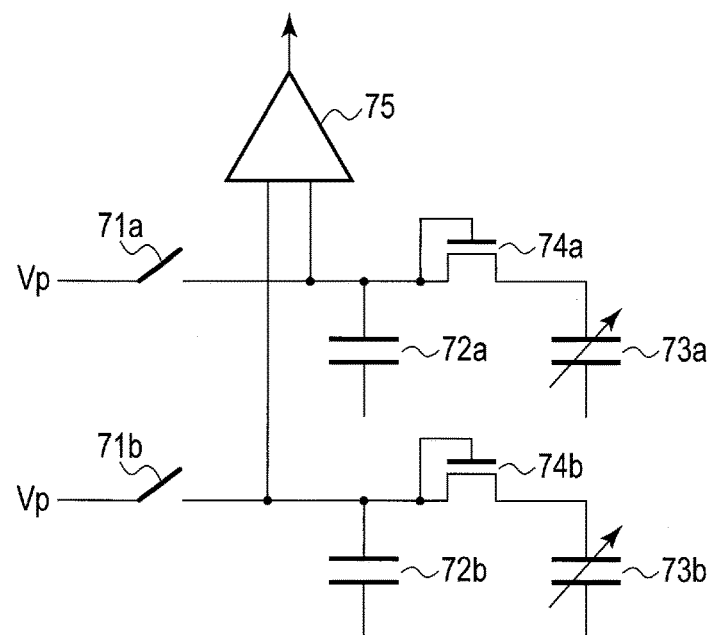
F I G. 7A
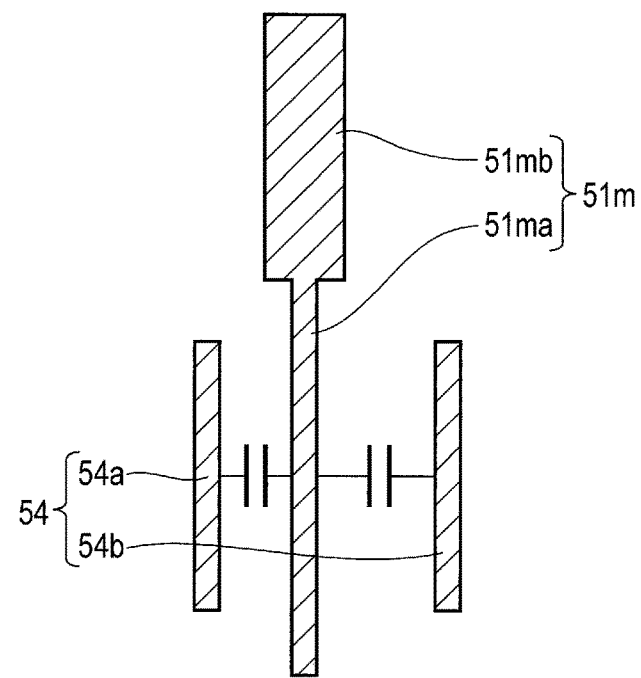
F I G. 7B

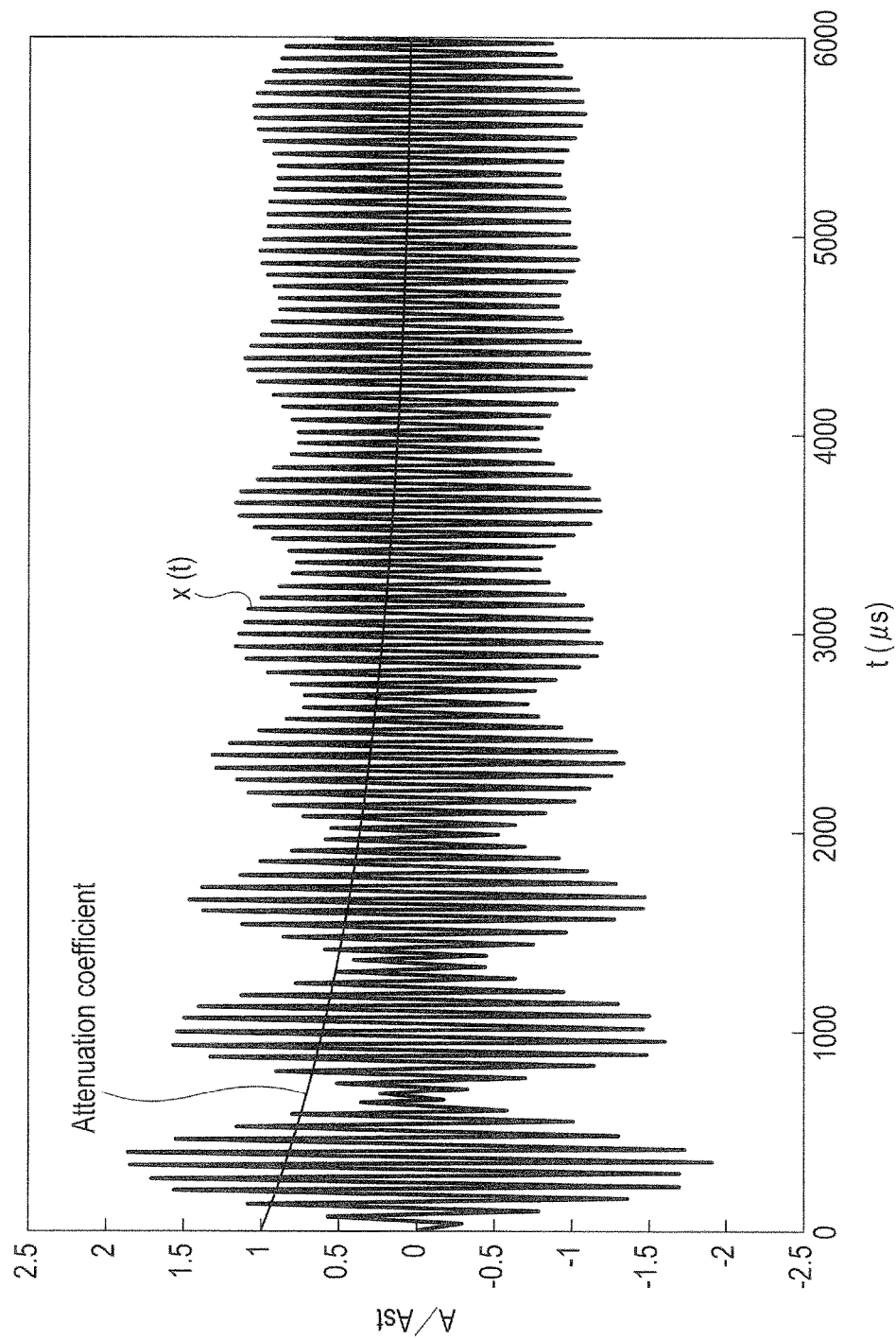
F I G. 8A

| name | value | unit |
|---|---|---|
| Omega | 0.01 | rad/sec |
| y_0 | 1.00E-05 | m |
| m_C | 5.00E-09 | Kg |
| m_x | 5.00E-09 | Kg |
| m_y | 5.00E-09 | Kg |
| k_x | 4.44E+01 | N/m |
| k_y | 5.37E+01 | N/m |
| omega_x | 9.42E+04 | 1/s |
| omega_y | 1.04E+05 | 1/s |
| omega_y/omega_x | 1.1 | |
| A | -1.10985E-11 | m |
| abs(A) | 1.10985E-11 | m |
| delta | 0.055520797 | |
| gamma_x | 1000 | |
| gamma_y | 0 | |

FIG. 8B

| name | value | unit |
|---|---:|---|
| Omega | 0.01 | rad/sec |
| y_0 | 1.00E-05 | m |
| m_C | 5.00E-09 | Kg |
| m_x | 5.00E-09 | Kg |
| m_y | 5.00E-09 | Kg |
| k_x | 4.44E+01 | N/m |
| k_y | 4.43E+01 | N/m |
| omega_x | 9.42E+04 | 1/s |
| omega_y | 9.42E+04 | 1/s |
| omega_y/omega_x | 0.999 | |
| A | -1.96536E-10 | m |
| abs(A) | 1.96536E-10 | m |
| delta | -1.384395699 | |
| gamma_x | 1000 | |
| gamma_y | 0 | |

FIG. 9B

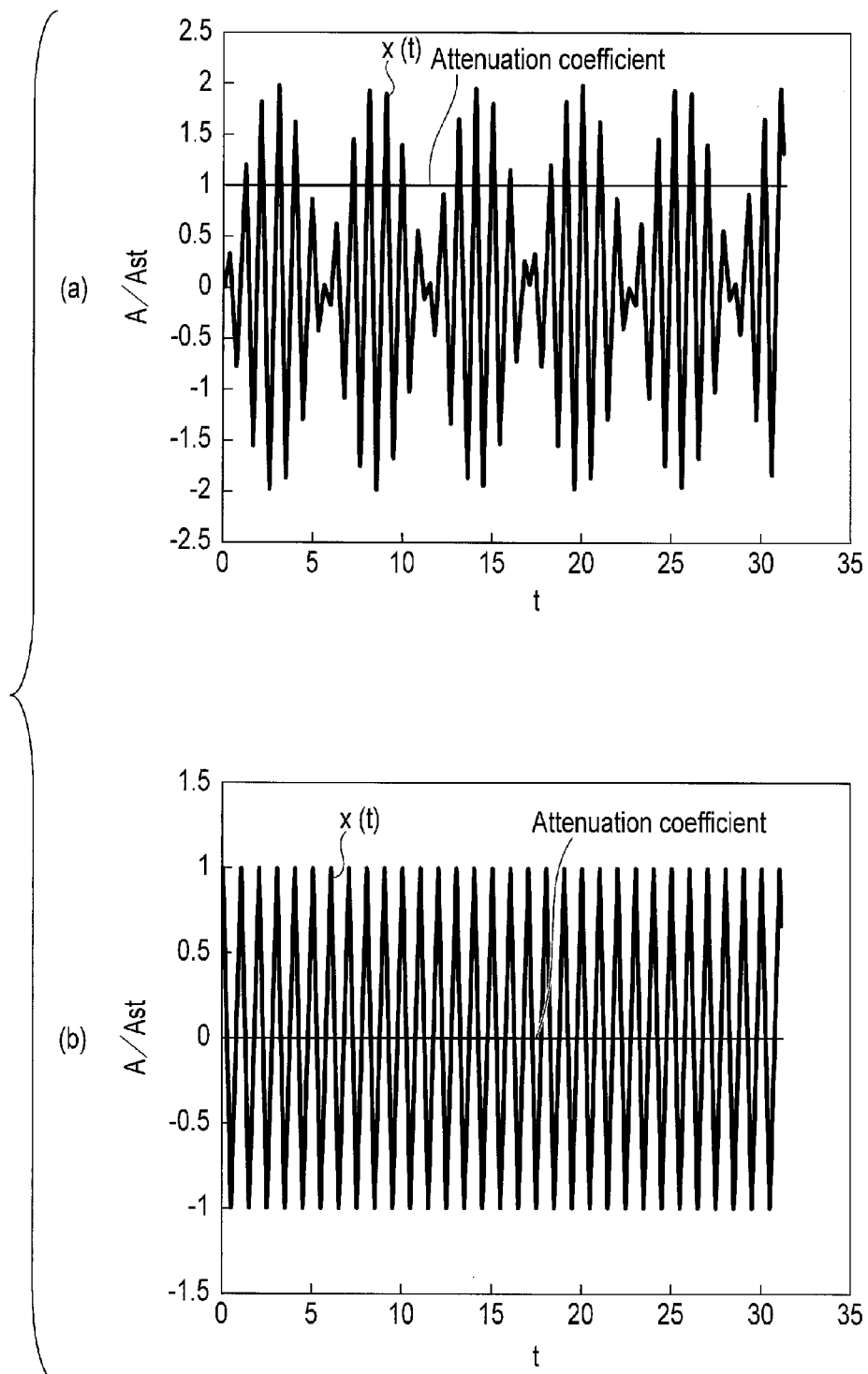
F I G. 10

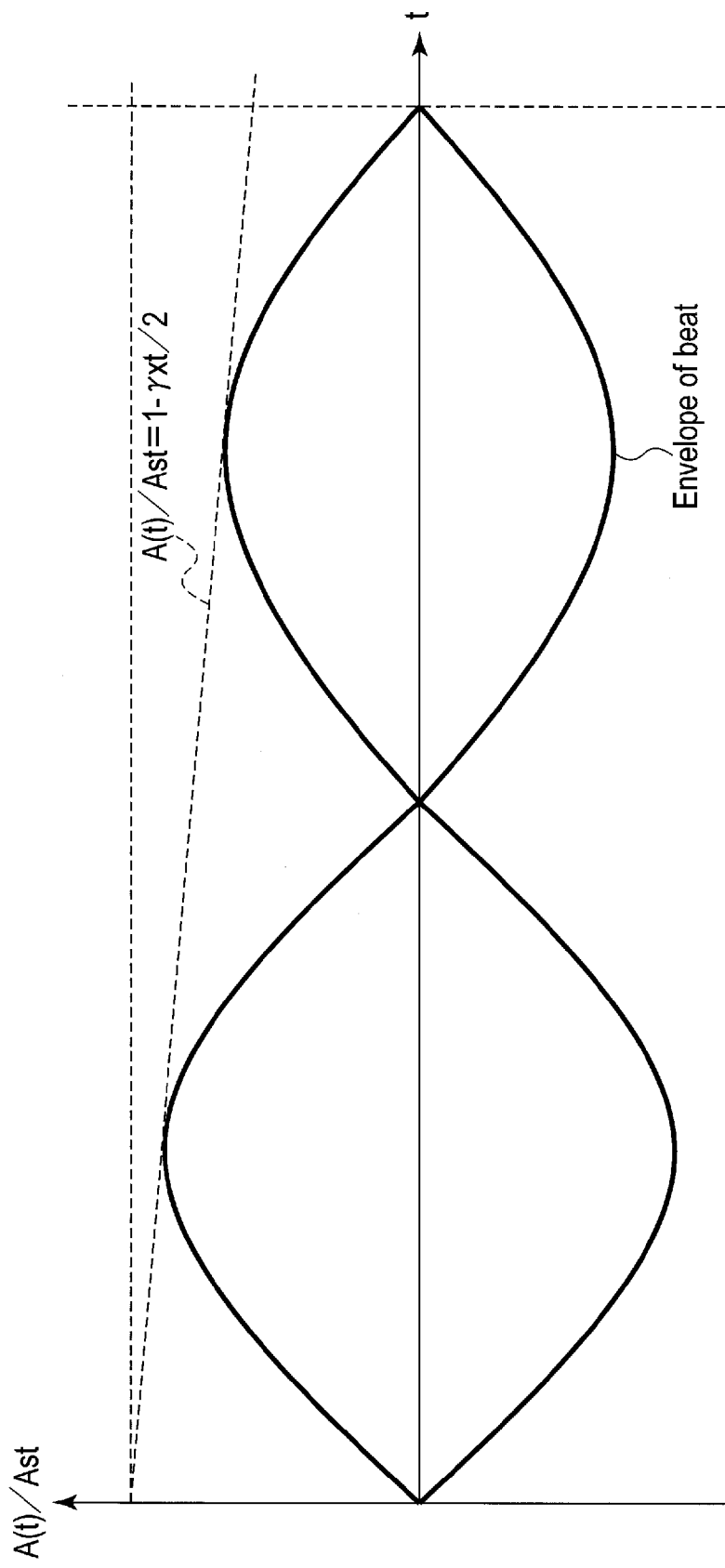
F I G. 12

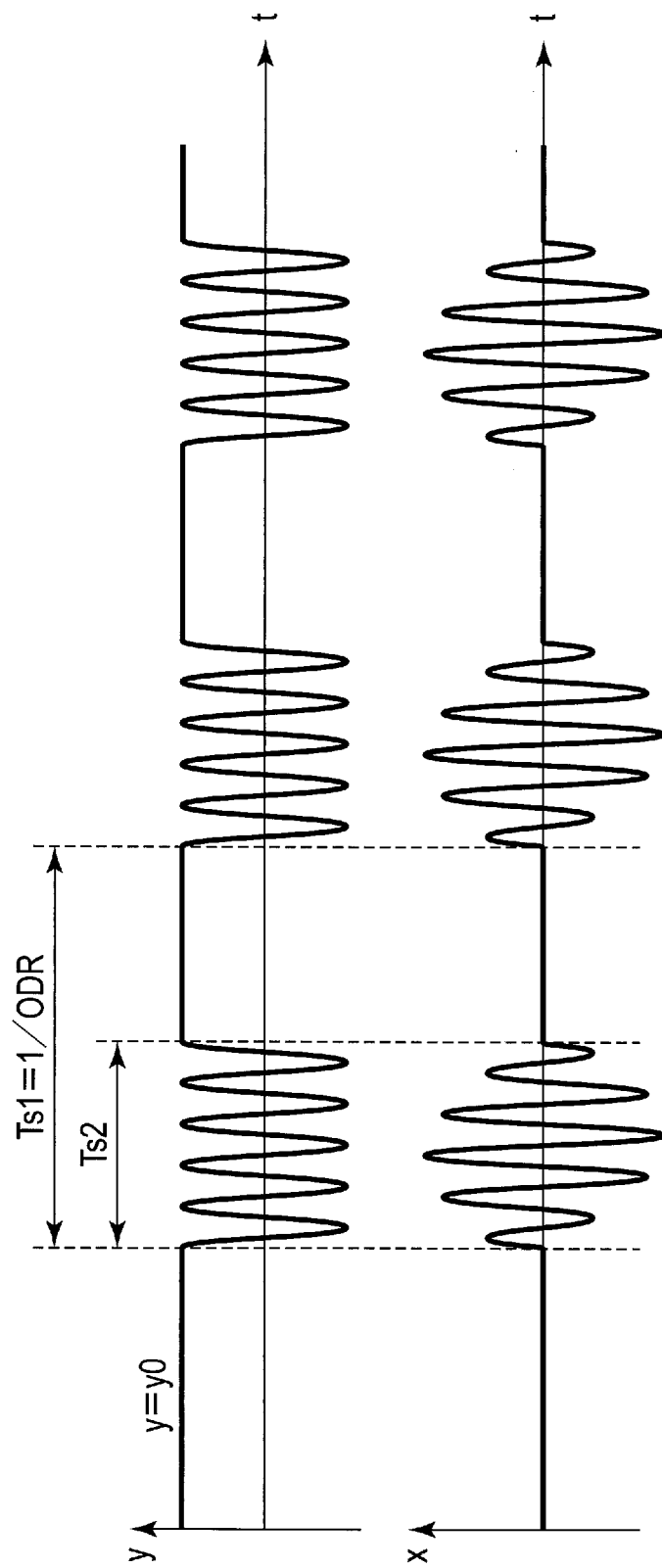

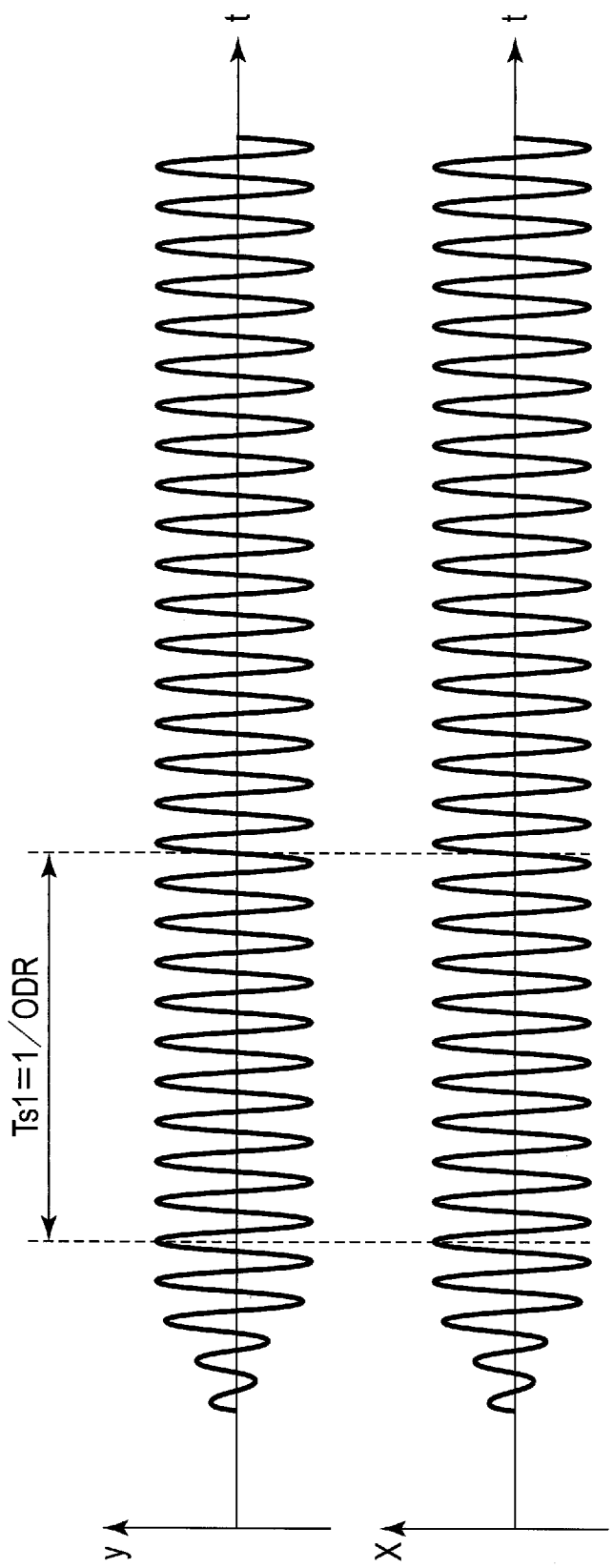
F I G. 14B

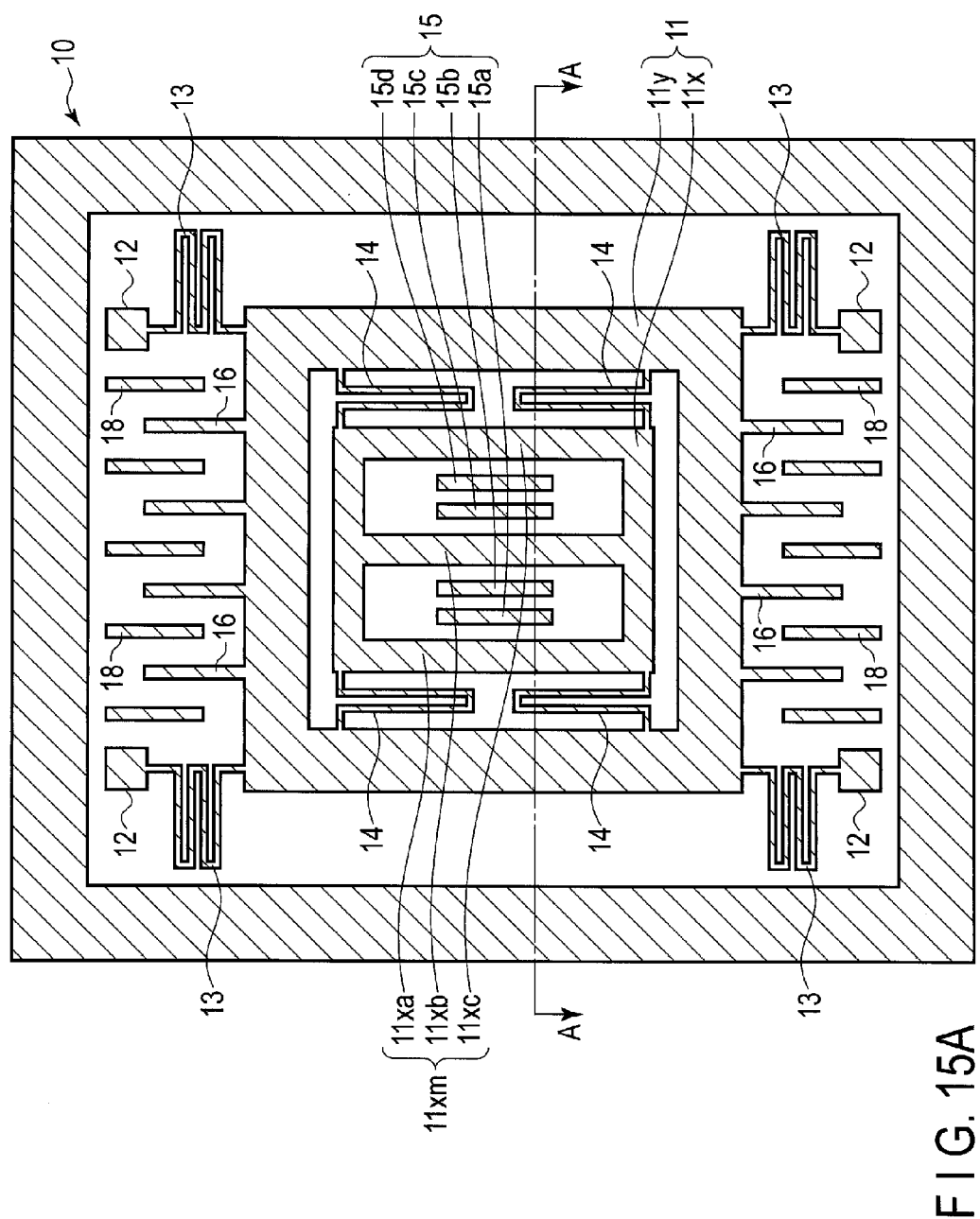
F I G. 15A

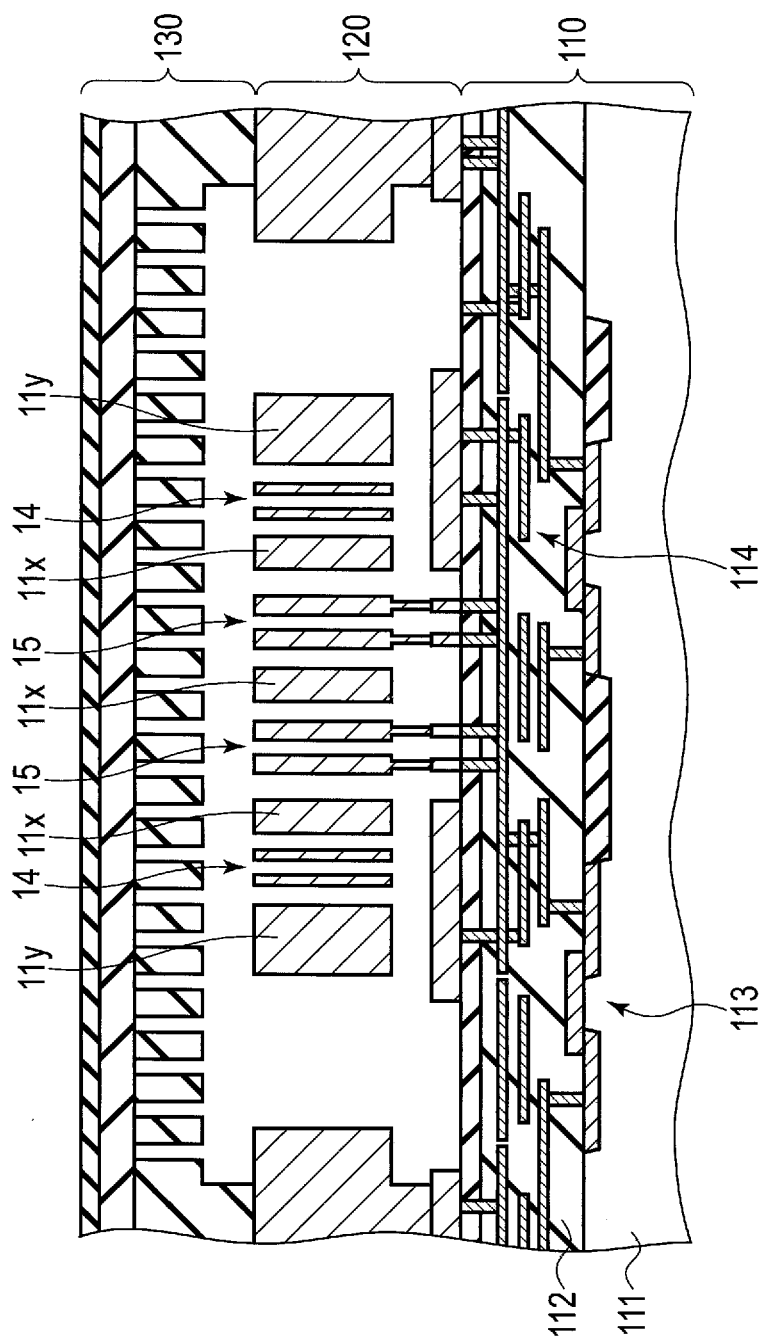
F I G. 15B

METHOD FOR ACQUIRING ANGULAR VELOCITY OF GYRO SENSOR AND DEVICE FOR DOING THE SAME

CROSS-REFERENCE TO RELATED APPLICATIONS

This application is based upon and claims the benefit of priority from Japanese Patent Application No. 2015-081227, filed Apr. 10, 2015, the entire contents of which are incorporated herein by reference.

FIELD

Embodiments described herein relate generally to a method for acquiring the rotational information of a gyro sensor and a device for doing the same.

BACKGROUND

Gyro sensors that are formed using micro electro-mechanical systems (MEMS) technology acquire the angular velocity of a vibrating movable body from the amplitude of the vibration based upon the Coriolis force applied to the vibrating movable body.

Conventional gyro sensors have a problem of increasing in power consumption because a forced vibration is continuously applied to a movable body.

BRIEF DESCRIPTION OF THE DRAWINGS

FIG. 1A is a plan view schematically showing a structure of a gyro sensor according to an embodiment.

FIG. 2 is a graph showing vibrations of a movable body by the Coriolis force in the gyro sensor according to the embodiment.

FIG. 3 is a diagram showing a structure of the gyro sensor according to the embodiment and a structure of a device for acquiring the angular velocity of the gyro sensor.

FIG. 4 is a flowchart showing a method for acquiring the angular velocity of the gyro sensor according to the embodiment.

FIG. 5B is a diagram showing a state after the start of vibration of the gyro sensor according to the embodiment.

FIG. 6A is a plan view schematically showing a structure of a gyro sensor according to a modification to the embodiment.

FIG. 6B is a diagram showing an initial state of the gyro sensor according to the modification to the embodiment.

FIG. 6C is a diagram showing a state after the start of vibration of the gyro sensor according to the modification to the embodiment.

FIG. 6D is a diagram showing another state after the start of vibration of the gyro sensor according to the modification to the embodiment.

FIG. 7A is an electrical diagram showing an arrangement of a sensing circuit according to the embodiment.

FIG. 7B is a diagram showing a state of x-direction vibration of the gyro sensor according to the embodiment based on the Coriolis force.

FIG. 8A is a chart showing an x-direction vibration waveform and an x-direction attenuation coefficient of the movable body in the non-steady state when the x-direction resonant angular frequency and y-direction resonant angular frequency of the movable body are different from each other in the gyro sensor according to the embodiment.

FIG. 8B is a table presenting the parameters shown in the chart of FIG. 8A.

FIG. 9B is a table presenting the parameters shown in the chart of FIG. 9A.

FIG. 10 shows an x-direction vibration waveform and an x-direction attenuation coefficient of a movable body when a damping factor is very small according to the embodiment.

FIG. 12 is a chart showing a condition under which vibration needs to attenuate considerably more slowly in the gyro sensor according to the embodiment.

FIG. 14A is a timing chart showing timing at which a movable body stops vibrating in the gyro sensor according to the embodiment.

FIG. 14B is a chart showing a comparative example relative to FIG. 14A.

FIG. 15A is a plan view schematically showing an example of a structure in which the gyro sensor according to the embodiment is formed on a semiconductor substrate.

FIG. 15B is a cross-sectional view schematically showing the structure of FIG. 15A.

DETAILED DESCRIPTION

Figure 1B:
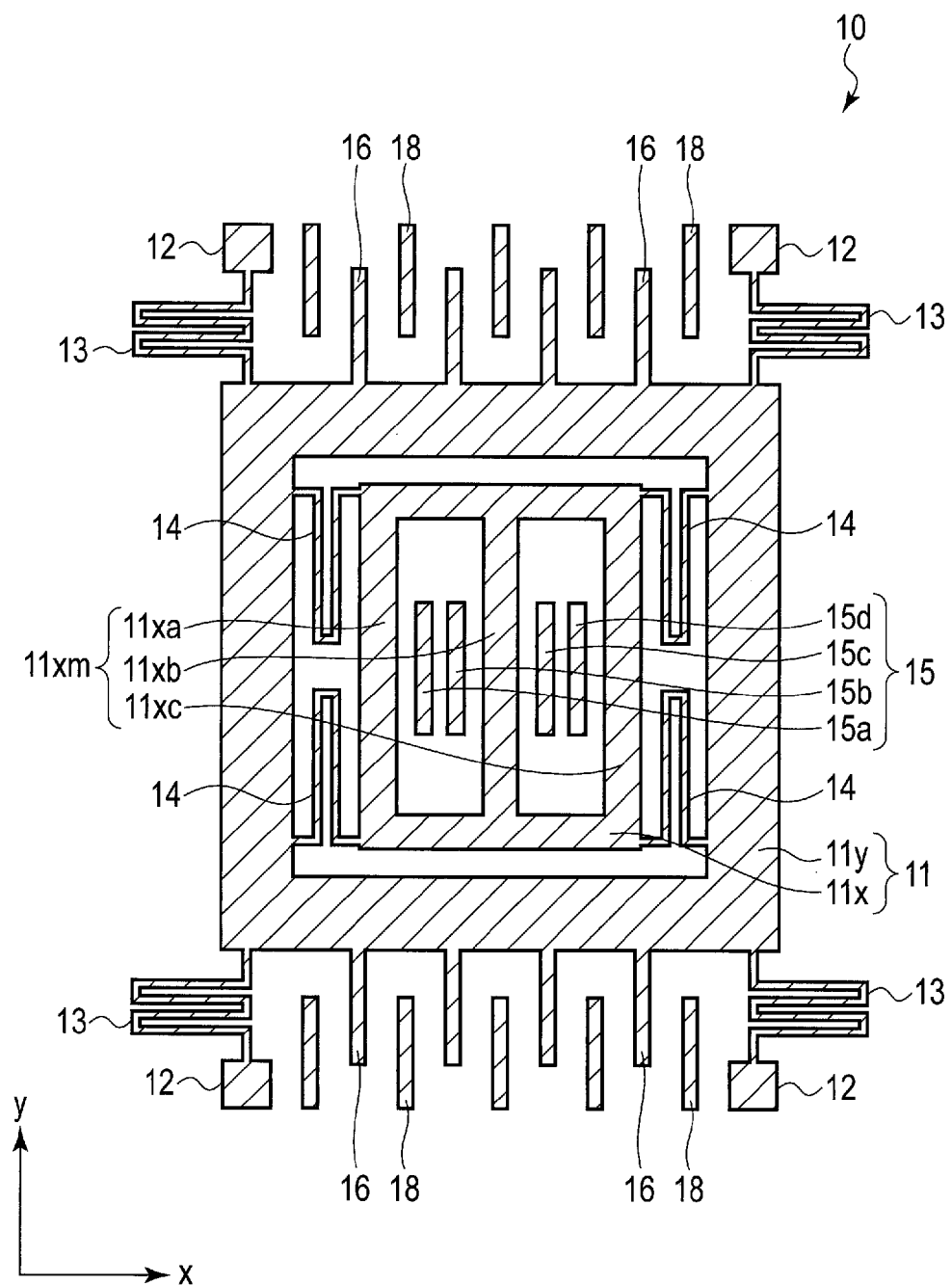
FIG. 1B is a plan view schematically showing a structure of a gyro sensor according to a modification to the embodiment.

In general, according to one embodiment, a method of acquiring angular velocity of a gyro sensor, includes: sensing a predetermined physical quantity which depends upon an amplitude of a vibration in a second direction, the vibration in the second direction being based on Coriolis force that is applied to a movable body which is vibrating in a first direction; and calculating angular velocity of the movable body based on the sensed predetermined physical quantity, wherein the predetermined physical quantity is sensed when the vibration in the second direction based on the Coriolis force is in a non-steady state.

An embodiment will be described with reference to the accompanying drawings.

FIG. 1A is a plan view schematically showing a structure of a gyro sensor according to an embodiment. The gyro sensor is formed using MEMS technology.

FIG. 1A shows a gyro sensor 10, and the gyro sensor 10 includes a movable body (movable portion) 11 and the movable body 11 includes a y-direction movable portion 11y and an x-direction movable portion 11x. The y-direction movable portion 11y forms a y-direction mass of the movable body 11 and the x-direction movable portion 11x forms an x-direction mass of the movable body 11. The x-direction movable portion 11x includes a movable electrode portion 11xm, and the movable electrode portion 11xm includes three portions 11xa, 11xb and 11xc.

A spring portion 13 is provided between the y-direction movable portion 11y and an anchor portion (fixing portion) 12. A spring portion 14 is provided between the y-direction movable portion 11y and the x-direction movable portion 11x.

A fixed electrode portion 15 is provided inside the pattern of the x-direction movable portion 11x. In this embodiment, the fixed electrode portion 15 includes four portions 15a, 15b, 15c and 15d.

The y-direction movable portion 11y includes projecting portions 16. Stoppers 17 are provided on the extensions of the projecting portions 16. Drive electrodes 18 are provided close to the projecting portions 16. The drive electrodes 18 are fixed to the substrate. The potential of the stoppers 17 is set at the same as that of the movable body 11 or set in a floating state in order to prevent stiction. In this embodiment, stoppers need not be provided as shown in FIG. 1B.

When the movable body 11 vibrates in the y direction (first direction) while rotating, it is vibrated in the x direction (second direction) by the Coriolis force. In general, angular velocity is proportionate to the amplitude of x-direction vibration based upon the Coriolis force. It is thus possible to calculate the angular velocity of the rotation of the movable body 11 from the amplitude of the x-direction vibration.

More specifically, when the x-direction movable portion 11x of the movable body 11 is vibrated in the x direction by the Coriolis force, a distance between the fixed electrode portion 15 and the movable electrode portion 11xm varies with the vibration. When the distance between the fixed electrode portion 15 and the movable electrode portion 11xm varies, capacitance between them also varies. If a variation of the capacitance is sensed, a distance between the fixed electrode portion 15 and the movable electrode portion 11xm can be measured, and an amplitude of x-direction vibration of the movable body 11 can be obtained.

FIG. 2 is a graph showing X-direction vibrations of the movable body 11 by the Coriolis force. In this graph, the horizontal axis indicates time and the vertical axis indicates an x-direction amplitude ratio (a ratio of amplitude to vibration in a steady state).

As shown in FIG. 2, after non-steady state vibration occurs, steady state vibration occurs. In this embodiment, an amplitude of x-direction vibration is sensed when the x-direction vibration based upon the Coriolis force is in a non-steady state. Usually, a predetermined physical quantity, which depends on the amplitude of x-direction vibration based upon the Coriolis force, is sensed, as will be described later. For example, the predetermined physical quantity is based on the capacitance between the fixed electrode portion 15 and the movable electrode portion 11xm. On the basis of the sensed predetermined physical quantity, the angular velocity of the movable body 11 is calculated.

Conventionally, the amplitude of x-direction vibration was sensed when the x-direction vibration was in a steady state. However, a given period of time is required until the vibration reaches a steady state. A gyro sensor needs to perform a sensing operation in a short cycle and accordingly, it needs to perform the sensing operation while giving a forced vibration to a movable body continuously. In other words, the gyro sensor needs to perform a sensing operation without stopping a forced vibration. In such a conventional method, a forced vibration is applied to a movable body continuously and thus power consumption is increased.

In this embodiment, the amplitude of vibration based upon the Coriolis force is sensed when the vibration is in a non-steady state. Accordingly, the amplitude of vibration can be sensed in a short time and the vibration need not be continued. In this embodiment, therefore, an exact sensing operation can be performed without giving a forced vibration to a movable body continuously, with the result that power consumption can greatly be decreased.

FIG. 3 is a diagram showing a structure of the gyro sensor according to the embodiment and a structure of a device for acquiring the angular velocity of the gyro sensor. In FIG. 3, the spring portions 13 and 14 are simply shown.

In FIG. 3, a drive voltage supply circuit 31 supplies a drive voltage to the drive electrodes 18. The supply of a drive voltage to the drive electrodes 18 makes it possible to vibrate the movable body 11 forcibly in the y direction. When the drive voltage supply circuit 31 supplies a given constant voltage to the drive electrodes 18, the projecting portions 16 can be fixed to the stoppers 17.

A sensing unit 32 senses a predetermined physical quantity that depends on the amplitude of x-direction vibration based upon the Coriolis force that is applied to the movable body 11 which is vibrating in the y-direction. In this embodiment, the predetermined physical quantity is based on the capacitance between the fixed electrode portion 15 and the movable electrode portion 11xm. More specifically, the sensing unit 32 senses a potential difference between the fixed electrode portion 15 and the movable electrode portion 11xm. The sensing of the potential difference will be described in detail later.

An angular velocity calculating unit 33 calculates the angular velocity of the movable body 11 on the basis of the predetermined physical quantity (physical quantity based on the capacitance) sensed by the sensing unit 32.

FIG. 4 is a flowchart showing a method for acquiring the angular velocity of the gyro sensor according to the embodiment. Below is a description of a case where no forced vibration is applied to the movable body 11.

Figure 5A:
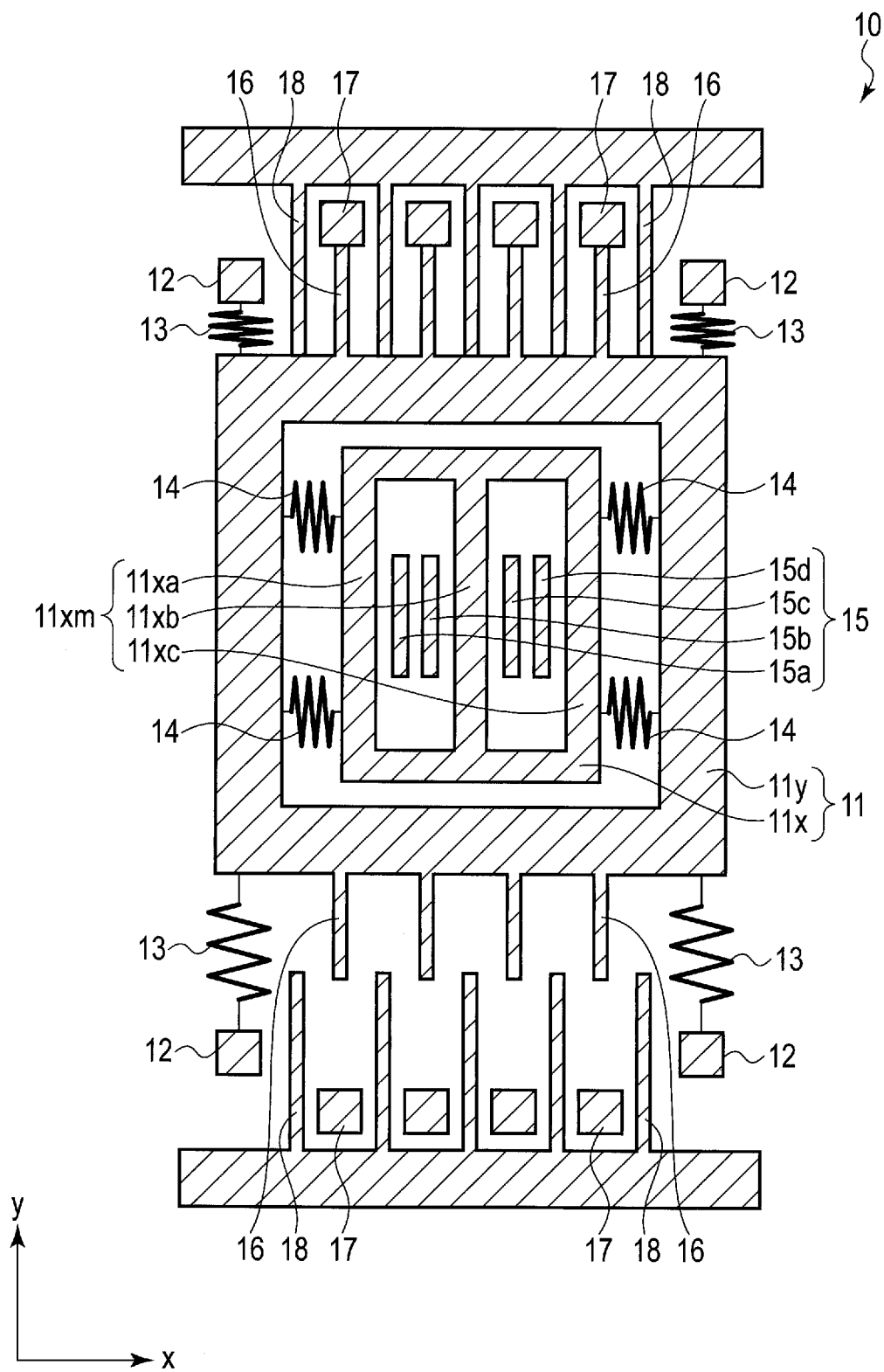
FIG. 5A is a diagram showing the initial state of the gyro sensor according to the embodiment.

First, the gyro sensor 10 is set in the initial state (S11). FIG. 5A is a diagram showing the initial state of the gyro sensor according to the embodiment. As shown in FIG. 5A, the movable body 11 is stationary while the projecting portions 16 contact the stoppers 17. More specifically, the projecting portions 16 are brought into contact with the stoppers 17 by causing an appropriate potential difference (e.g., 20 V) between the drive electrodes 18 and the movable body 11. At this time, an amount of displacement of the movable body 11 in the y direction is, for example, about 20 µm. The stoppers 17 serve as vibration stopping portions for stopping the y-direction vibration of the movable body 11 after a predetermined physical amount is sensed. Thus, the stoppers 17 cause the movable body 11 to be maintained in the state where the last vibration is stopped.

Figure 5C:
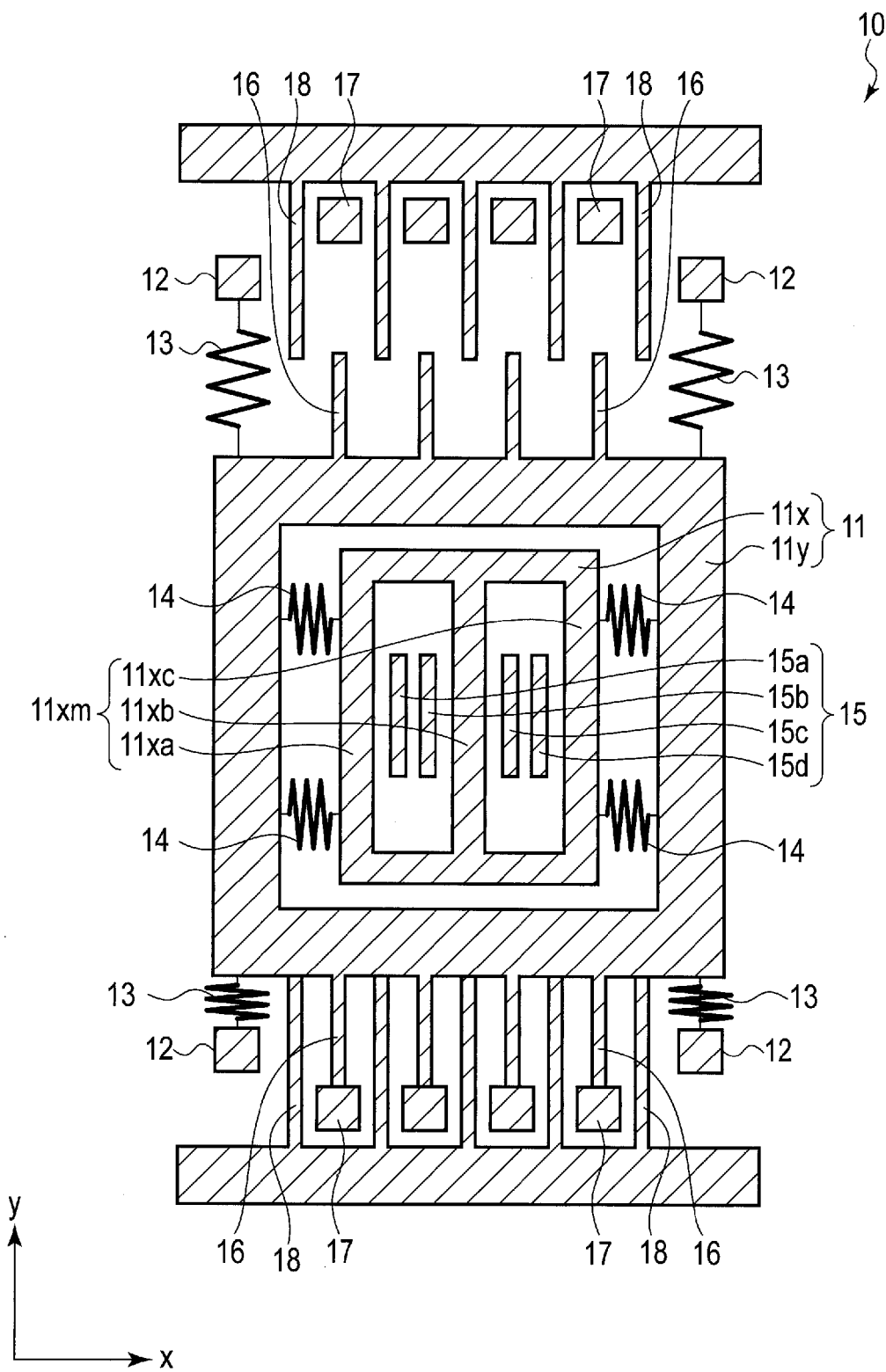
FIG. 5C is a diagram showing a state after the start of vibration of the gyro sensor according to the embodiment.

Next, the gyro sensor 10 starts to vibrate in the y direction (S12). More specifically, a potential difference between the drive electrodes 18 and the movable body 11 is set at zero to release the movable body 11 from the stoppers 17, with the result that the movable body 11 starts to vibrate in the y direction. In other words, the y-direction vibration of the movable body 11 starts from the state in which the movable body 11 is forcibly displaced in the y direction against the force of the spring portion 13. As a result, the movable body 11 vibrates in the y direction as shown in FIGS. 5B and 5C. When the Q value of the vibration is large, the movable body 11 can be vibrated continuously over a long period of time without receiving any forced vibration. When no forced vibration is applied to the movable body 11, a circuit operation is not required for forced vibration, thus making it possible to decrease power consumption greatly.

Figure 5D:
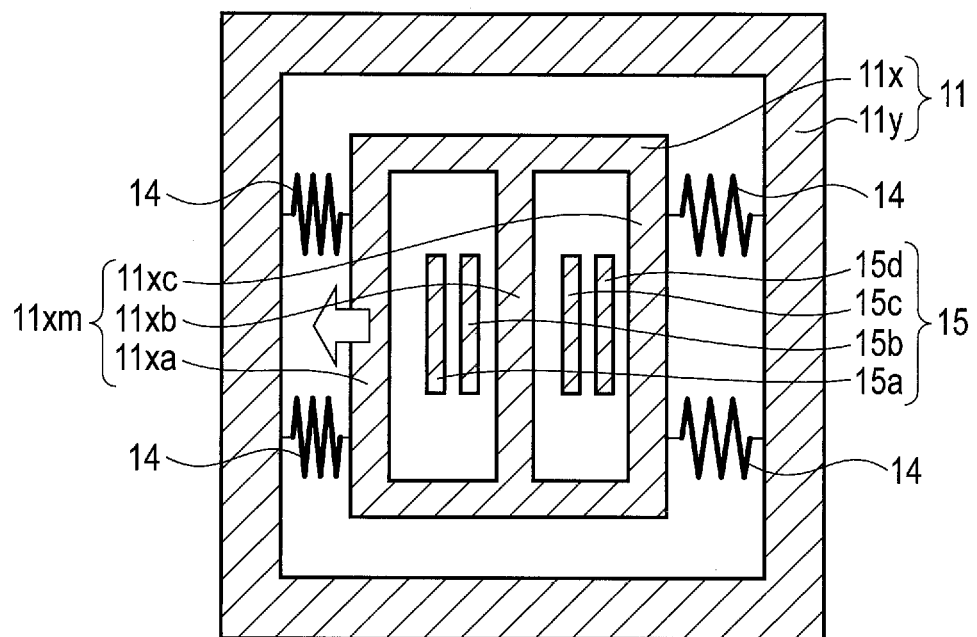
FIG. 5D is a diagram showing a state of x-direction vibration of the gyro sensor according to the embodiment based on the Coriolis force.

When the movable body 11 rotates while vibrating in the y direction, it is vibrated in the x direction by the Coriolis force. As has been described, when the movable body 11 vibrates in the x direction, a distance between the fixed electrode portion 15 and the movable electrode portion 11xm varies, as does the capacitance between them, as shown in FIG. 5D. The sensing unit 32 senses the variation of the capacitance to obtain the amplitude of the x-direction vibration of the movable body 11. In other words, the sensing unit 32 senses a predetermined physical quantity (physical quantity based on the capacitance) which depends on the amplitude of x-direction vibration based upon the Coriolis force (S13).

When the sensing unit 32 senses a predetermined physical quantity, the y-direction vibration of the movable body 11 is stopped (S14). More specifically, the y-direction vibration of the movable body 11 is stopped after the peak of amplitude of x-direction vibration of the movable body 11 is sensed and before the x-direction vibration of the movable body 11 reaches the steady state.

The movable body 11 is caught by the stoppers 17 serving as vibration stopping portions and accordingly its y-direction vibration is stopped. More specifically, an appropriate potential difference is caused between the drive electrodes 18 and the movable body 11 and when the amplitude of the y-direction vibration of the movable body 11 reaches its peak, the projecting portions 16 of the movable body 11 are caught to stop the vibration. If the y-direction vibration is stopped when the amplitude of the vibration reaches its peak, energy for pulling up the movable body 11 at the start of the next vibration becomes unnecessary, thereby making it possible to decrease power consumption.

The angular velocity calculating unit 33 calculates the angular velocity of the movable body 11 on the basis of the sensed predetermined physical quantity (S15). More specifically, the angular velocity of the movable body 11 is calculated on the basis of the predetermined physical quantity sensed when the amplitude of x-direction vibration of the movable body 11 reaches its peak.

As has been described, the predetermined physical quantity is based on the capacitance between the fixed electrode portion 15 and the movable electrode portion 11xm, and the sensing unit 32 senses a voltage difference (potential difference) between the fixed electrode portion 15 and the movable electrode portion 11xm. As will be described later, when the sensing unit 32 senses the voltage difference, it also senses a differential voltage. For example, the sensing unit 32 senses a potential difference Va between a fixed electrode portion 15a and a movable electrode portion 11xa and a potential difference Vb between a fixed electrode portion 15b and a movable electrode portion 11xb to obtain a potential difference between Va and Vb as a differential voltage. When the amplitude of x-direction vibration of the movable body 11 reaches its peak, the differential voltage reaches its peak, too. Therefore, the angular velocity of the movable body 11 can be calculated from the differential voltage which has reached its peak.

In general, angular velocity can be calculated from the amplitude of x-direction vibration based on the Coriolis force. As is seen from the above, the amplitude of x-direction vibration can be obtained if a differential voltage can be sensed. It is thus possible to calculate the angular velocity of the movable body 11 on the basis of the sensed differential voltage.

The angular velocity can be calculated on the basis of a predetermined physical quantity (e.g., the foregoing differential voltage) sensed at a specific timing after the movable body 11 starts to vibrate in the y direction. As will be described later, the state of x-direction vibration of the movable body 11 based on the Coriolis force can be expected in advance. Therefore, a time when the x-direction vibration of the movable body 11 reaches its peak can be expected in advance to calculate the angular velocity on the basis of a predetermined physical quantity that is sensed at an expected, specific timing.

As described above, in the present embodiment, a predetermined physical quantity that depends upon the amplitude of x-direction vibration based on the Coriolis force is sensed when the x-direction vibration is in a non-steady state. The predetermined physical quantity can thus be sensed by short-time vibration and the vibration need not be continued. In this embodiment, therefore, the sensing operation can be carried out with accuracy without giving a forced vibration to a movable body continuously, with the result that power consumption can be decreased.

Conventionally, the sensing operation was carried out in a steady state; thus, a forced vibration had to be applied continuously, which increased power consumption. Assume here that the vibration frequency is 10 kHz and the output data rate (ODR) is 100 Hz and, in this case, the vibration period is 100 µsec and the output period is 10 msec. In this embodiment, for example, the sensing operation is completed when vibration is caused for 10 periods, or the sensing operation is completed after a lapse of 1 msec from the beginning of vibration and then the vibration is stopped. In other words, the vibration is stopped for a period of 9 msec of the output period of 10 msec, with the result that power consumption can be decreased to one tenth the conventional power consumption.

In this embodiment, a sensing operation is carried out before vibration is brought into a steady state and thus startup time can be shortened.

Furthermore, in this embodiment, the angular velocity can be calculated with higher accuracy if the calculation is based upon a predetermined physical quantity that is sensed when the amplitude of x-direction vibration of a movable body reaches its peak.

Furthermore, in this embodiment, the stoppers are provided as vibration stopping portions for stopping the y-direction vibration of a movable body and thus the vibration of the movable body can accurately be stopped after a sensing operation is completed. In this case, if the movable body is caught when the amplitude of the y-direction vibration reaches its peak, the movable body starts to vibrate from the peak position in the y direction in the next sensing operation, and the sensing operation can be performed efficiently.

In the foregoing embodiment, a forced vibration can be applied to the movable body 11 and, in this case, after a y-direction forced vibration is applied to the movable body 11 for a fixed period of time, it can be stopped. When a forced vibration is applied, closed-loop control or open-loop control can be performed. As driving force for applying a forced vibration, for example, electrostatic force, piezoelectric force and electromagnetic force can be employed.

FIG. 6A is a plan view schematically showing a structure of a gyro sensor according to a modification to the present embodiment. The basic matters of this modification are the same as those of the foregoing embodiment and thus a description of the same matters will be omitted. The gyro sensor according to this modification is also formed using MEMS technology.

FIG. 6A shows a gyro sensor 50, and the gyro sensor 50 includes a movable body (movable portion) 51 in which a y-direction movable portion and an x-direction movable portion are formed integrally as one unit. The movable body 51 includes a movable electrode portion 51m having a thin portion 51ma and a thick portion 51mb. A spring portion 53 is provided between the movable body 51 and an anchor portion (fixing portion) 52. A fixed electrode portion 54 is provided inside the pattern of the movable body 51. In this modification, the fixed electrode portion 54 includes two portions 54a and 54b. The movable body 51 is provided with comb-teeth portions 55 and a drive electrode 56 is provided close to each of the comb-teeth portions 55.

FIGS. 6B, 6C and 6D are diagrams showing the gyro sensor 50 that is vibrating in the y direction. In FIG. 6B, a potential difference is applied between each of the comb-teeth portions 55 and its corresponding drive electrode 56 to set the gyro sensor 50 in the initial state. If the potential difference is set at zero, the gyro sensor 50 starts to vibrate as shown in FIGS. 6C and 6D.

In this modification, too, as in the foregoing embodiment, when the movable body 51 rotates while vibrating in the y direction, it is vibrated in the x direction by the Coriolis force. As a result, a distance between the fixed electrode portion 54 and the movable electrode portion 51m varies, as does the capacitance between them. On the basis of the variation of the capacitance, the amplitude of x-direction vibration of the movable body 51 (a predetermined physical quantity that depends upon the x-direction vibration) can be obtained.

More specifically, a potential difference Va between the portion 54a of the fixed electrode portion 54 and the movable electrode portion 51m and a potential difference Vb between the portion 54b of the fixed electrode portion 54 and the movable electrode portion 51m are sensed to obtain a potential difference between Va and Vb as a differential voltage. The angular velocity of the movable body 51 can be calculated from the differential voltage. When the thick portion 51mb of the movable electrode portion 51m is located between the portions 54a and 54b of the fixed electrode portion 54, a distance between these portions is shortened and thus sensing capability can be increased.

FIG. 7A is an electrical diagram showing an arrangement of a sensing circuit (corresponding to the sensing unit 32 shown in FIG. 3). This sensing circuit can be applied to both the foregoing embodiment and the modification.

The sensing circuit shown in FIG. 7A includes switches 71a and 71b, capacitors 72a and 72b, variable capacitors 73a and 73b, diode-connected transistors 74a and 74b, and a differential voltage sensing circuit 75. Assume here that the capacitance of each of the capacitors 72a and 72b is C0, that of the variable capacitor 73a is C1, and that of the variable capacitor 73b is C2.

For example, in the modification shown in FIG. 6A, the portion 54a of the fixed electrode portion 54 and the movable electrode portion 51m constitute a variable capacitor corresponding to the variable capacitor 73a, and the portion 54b of the fixed electrode portion 54 and the movable electrode portion 51m constitute a variable capacitor corresponding to the variable capacitor 73b.

First, the switches 71a and 71b are turned on to apply voltages Vp to the capacitors. Thus, charges Q, which are given by the following equation, are stored in the capacitors.

$$Q=Vp(C0+C1)=Vp(C0+C2)$$

After the charging of the capacitors are completed, the switches 71a and 71b are turned off.

When the gyro sensor starts to vibrate and rotates to generate the Coriolis force, the movable electrode portion 51m vibrates in the x direction as shown in FIG. 7B. Then, as shown in FIG. 6D, when the thick portion 51mb of the movable electrode portion 51m is located between the portions 54a and 54b of the fixed electrode portion 54, the capacitance of the variable capacitor 73a increases from C1 to C1', and that of the variable capacitor 73b increases from C2 to C2'. As a result, the voltage applied to the capacitor 72a and variable capacitor 73a becomes VP1, and the voltage applied to the capacitor 72b and variable capacitor 73b becomes VP2. Accordingly, the following equation is satisfied.

$$Q=Vp1(C0+C1')=Vp2(C0+C2')$$

The differential voltage sensing circuit 75 senses a differential voltage between voltages Vp1 and Vp2. On the basis of the sensed differential voltage, angular velocity can be obtained.

In the foregoing embodiment and modification, it is likely that the center of x-direction amplitude based on the Coriolis force will be shifted to cause an offset. Therefore, a circuit for sensing a difference (Ap−An) between the peak Ap of a positive-direction amplitude and the peak An of a negative-direction amplitude can be provided and, in this case, angular velocity can be obtained from the peak difference (Ap−An).

The sensing circuit can be configured in the same manner as a circuit for sensing an envelope of a wireless receiver IC including an LNA, a mixer and the like. Furthermore, the angular velocity can be sensed by analog-to-digital converting a vibration waveform based upon the Coriolis force.

Below is a description of a result of analysis of the vibration in the present embodiment. In this analysis, no forced vibration is applied to the movable body of the gyro sensor.

The following are equations expressing the y-direction movement of the movable body.

$$\ddot{y} + \gamma_y \dot{y} + \omega_y^2 y = 0$$

$$\gamma_y \equiv \frac{b_y}{m_y}$$

$$\omega_y \equiv \sqrt{\frac{k_y}{m_y}}$$

In the above equations, $\omega_y$ is a y-direction resonant angular frequency, $m_y$ is a y-direction mass of the movable body, $b_y$ is an attenuation coefficient in the y-direction vibration, and $k_y$ is a y-direction spring constant.

The initial conditions are given by the following equations.

$$y(0)=y_0$$

$$\dot{y}(0)=0$$

The following are solutions that satisfy the above equations.

$$y(t) = y_0 \exp\left(-\frac{\gamma_y t}{2}\right)\left[\cos \omega_2 t + \frac{\gamma_y}{2\omega_2}\sin \omega_2 t\right]$$

$$\dot{y}(t) = y_0\left(-\frac{\omega_y^2}{\omega_2}\right)\exp\left(-\frac{\gamma_y t}{2}\right)\sin \omega_2 t$$

$$\omega_2 \equiv \sqrt{\omega_y^2 - \left(\frac{\gamma_y}{2}\right)^2}$$

The following are motion equations in the x-direction of the movable body.

$$m_x \ddot{x} + b_x \dot{x} + k_x x = 2m_c \Omega \dot{y}$$

$$\ddot{x} + \gamma_x \dot{x} + \omega_x^2 x = 2\frac{m_c}{m_x}\Omega \dot{y}$$

$$\gamma_x \equiv \frac{b_x}{m_x}$$

$$\omega_x \equiv \sqrt{\frac{k_x}{m_x}}$$

In the above equations, $\omega_x$ is an x-direction resonant angular frequency, $m_x$ is an x-direction mass of the movable body, $b_x$ is an attenuation coefficient in the x-direction vibration, and $k_x$ is an x-direction spring constant. The following equation represents the Coriolis force.

$$2m_c \Omega \dot{y}$$

The initial conditions are given by the following equations.

$$x(0)=0$$

$$\dot{x}(0)=0$$

If the above equations are satisfied and $\gamma_y=0$, the following equations are given.

$$x(t) = A\left[\sin(\omega_2 t + \psi) + \exp\left(-\frac{\gamma_x t}{2}\right)D(t)\right]$$

$$D(t) = -\sin\psi\cos\omega_1 t - \frac{\left(\omega_2 \cos\psi - \frac{\gamma_x}{2}\sin\psi\right)\sin\omega_1 t}{\omega_1}$$

$$\omega_1 \equiv \sqrt{\omega_x^2 - \left(\frac{\gamma_x}{2}\right)^2}$$

$$\psi \equiv \tan^{-1}\left[\frac{\gamma_x \omega_z}{\omega_2^2 - \omega_x^2}\right]$$

$$A = a_0 \frac{1}{\sqrt{(\omega_x^2 - \omega_2^2)^2 + \omega_2^2 \gamma_x^2}}$$

$$a_0 = -2\Omega \frac{m_c}{m_x}\omega_2 y_0$$

FIG. 8A is a chart showing an x-direction vibration waveform x(t) and an x-direction attenuation coefficient of the movable body in the non-steady state when the x-direction resonant angular frequency $\omega_x$ and y-direction resonant angular frequency $\omega_y$ of the movable body are different from each other. FIG. 8B is a table presenting the parameters shown in the chart of FIG. 8A.

Figure 9A:
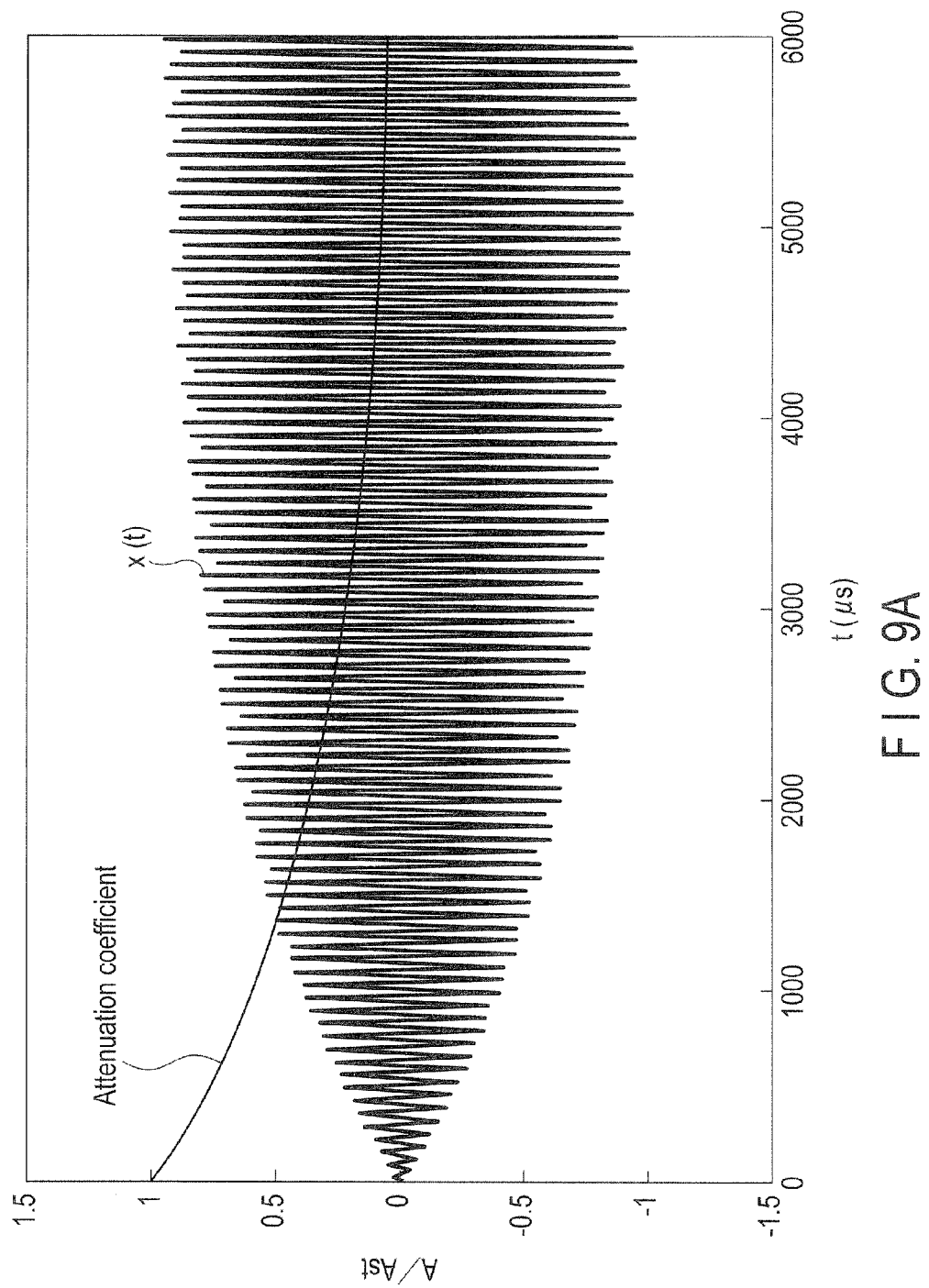
FIG. 9A is a chart showing an x-direction vibration waveform and an x-direction attenuation coefficient of a movable body in the non-steady state when the x-direction resonant angular frequency and y-direction resonant angular frequency of the movable body are equal (or almost equal) to each other in the gyro sensor according to the embodiment.

FIG. 9A is a chart showing an x-direction vibration waveform x(t) and an x-direction attenuation coefficient of the movable body in the non-steady state when the x-direction resonant angular frequency $\omega_x$ and y-direction resonant angular frequency $\omega_y$ of the movable body are equal (or almost equal) to each other. FIG. 9B is a table presenting the parameters shown in the chart of FIG. 9A.

FIG. 10 shows an x-direction vibration waveform x(t) and an x-direction attenuation coefficient of the movable body when a damping factor is very small. FIG. 10(a) shows a chart in the non-steady state, and FIG. 10(b) shows a chart in the steady state. In the non-steady state, too, the peak of the amplitude of a beat hardly varies in a short time. The peak of the amplitude in the non-steady state is twice as high as that of the amplitude in the steady state.

As is seen from the above, it is desirable to perform a sensing operation as described below.

In the case of FIG. 8A, the x-direction vibration of the movable body has a transient beat in the non-steady state. Since a beat is caused in the non-steady state, the peak of the amplitude of the beat is sensed. The sensing operation can be performed at a specific timing after the movable body starts to vibrate and, in this case, a time when the vibration reaches its peak can be expected in advance to perform the sensing operation at the expected, specific timing.

In the case of FIG. 9A, no beat is caused and thus the sensing operation is performed at a specific timing after the movable body starts to vibrate. In this case, the amplitude itself increases and thus, the sensing capability can be increased.

When $\gamma_y$ is not 0, the following x-direction motion equations are given.

$$\ddot{x} + \gamma_x \dot{x} + \omega_x^2 x = f_0 \exp\left(-\frac{\gamma_y t}{2}\right)\sin \omega_2 t$$

$$f_0 = -2\Omega \frac{m_c}{m_x}\frac{\omega_y^2}{\omega_2}y_0$$

$\beta_1$ and $\beta_2$ are defined as follows.

$$\beta_1 \equiv \frac{\gamma_x}{2}$$

$$\beta_2 \equiv \frac{\gamma_y}{2}$$

In this case, the motion equations are given as follows.

$$x(t)=Z_1(t)+Z_2(t)$$

$$Z_1(t)=\zeta_1 e^{-\beta_1 t}\sin(\omega_1 t+\Phi_1)$$

$$Z_2(t)=\zeta_2 e^{-\beta_2 t}\sin(\omega_2 t+\Phi_2)$$

Furthermore, the following equations are given.

$$\zeta_1 \equiv -\zeta_2 \frac{\sin\phi_1}{\sin\phi_2}$$

$$\zeta_2 \equiv \frac{f_0}{\sqrt{r^2+s^2}}$$

$$\phi_1 \equiv \tan^{-1}\left[\frac{\omega_1 s}{(\beta_1-\beta_2)s-\omega_2 r}\right]$$

$$\phi_2 \equiv \tan^{-1}\left[-\frac{s}{r}\right]$$

$$r \equiv 2\beta_2(\beta_2-\beta_1)+\omega_1^2-\omega_2^2$$

$$s \equiv -2\omega_2(\beta_2-\beta_1)$$

At the limit of "$\beta_2 \to 0$," the above equations are represented as follows.

$$x(t) = Z_1(t) + Z_2(t)$$

$$Z_1(t) \equiv \zeta_1 e^{-\beta_1 t} \sin(\omega_1 t + \phi_1)$$

$$Z_2(t) \equiv \zeta_2 \sin(\omega_2 t + \phi_2)$$

$$\zeta_2 \equiv \frac{f_0}{\sqrt{(\omega_1^2 - \omega_2^2)^2 + (2\omega_2 \beta_1)^2}}$$

$$r(\beta_2 = 0) \equiv \omega_1^2 - \omega_2^2$$

$$s(\beta_2 = 0) \equiv 2\omega_2 \beta_1$$

When $\beta_1$ and $\beta_2$ are small, the following equation is given.

$$x(t) = 2\zeta_2 \sin\left(\frac{\omega_1 + \omega_2}{2}t + \frac{\phi_1 + \phi_2}{2}\right)\cos\left(\frac{\omega_1 - \omega_2}{2}t + \frac{\phi_1 - \phi_2}{2}\right) - \zeta_2\left(\frac{\omega_2}{\omega_1} - 1\right)\sin(\omega_1 t + \phi_1) + 0(\beta_1, \beta_2)$$

In this Equation, the first term of the right side represents a component of the beat. The second term of the right side becomes zero when $\omega_1$ and $\omega_2$ are almost equal to each other.

Figure 11:
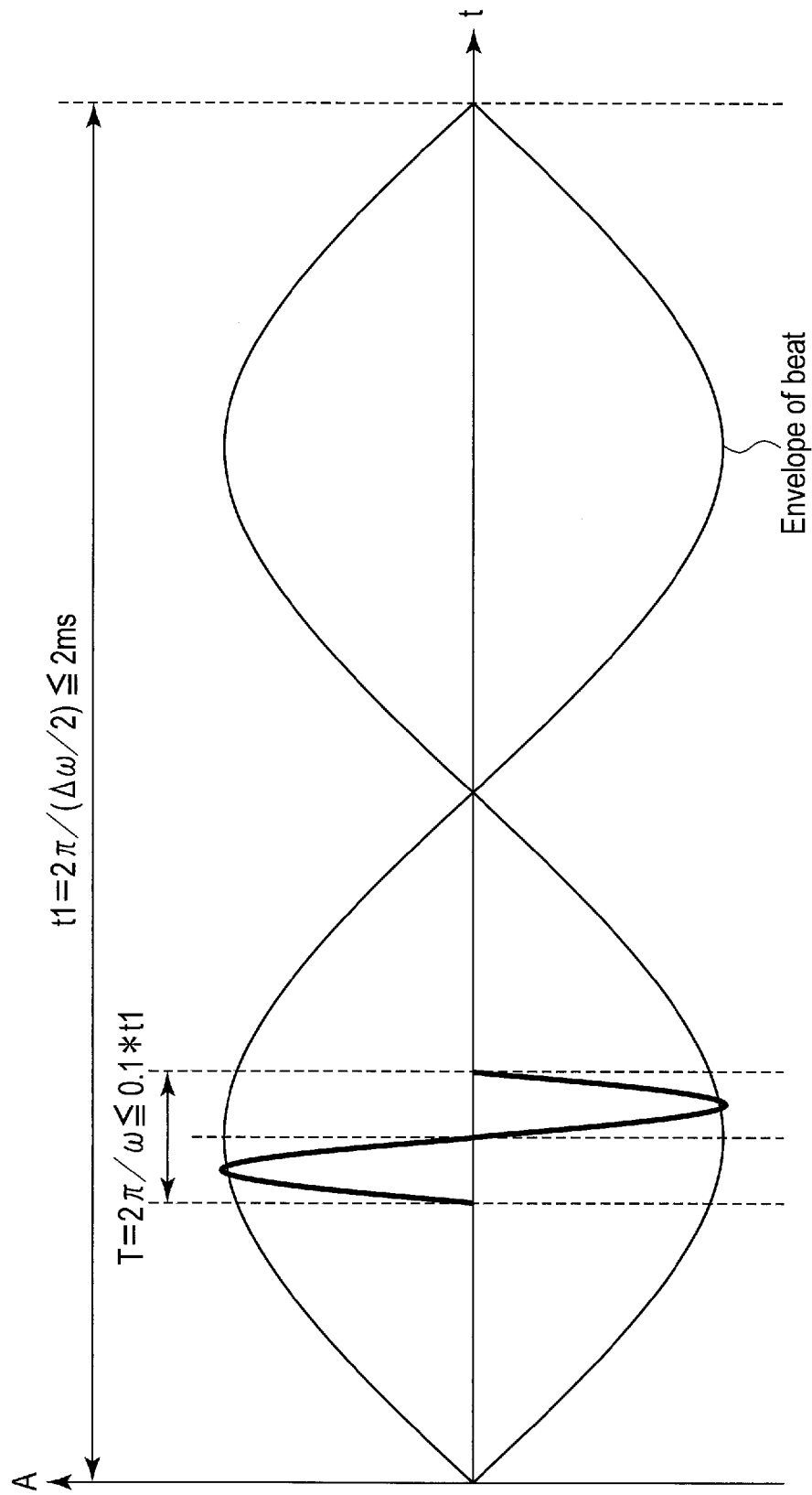
FIG. 11 is a chart showing a condition for completing a sensing operation within 1 msec and a condition for performing a sensing operation when the amplitude of a beat is large in the gyro sensor according to the embodiment.

FIG. 11 is a chart showing a condition for completing a sensing operation within 1 msec and a condition for performing a sensing operation when the amplitude of a beat is large.

In order to complete a sensing operation within 1 msec, a beat period has only to be 2 msec or shorter and specifically, the following condition has only to be met: $t_1 = 2\pi/(\Delta\omega/2) \leq 2$ msec, wherein $\Delta\omega$ is equal to $2\pi\Delta f$ ($\Delta\omega = 2\pi\Delta f$) and $\Delta f$ represents a difference between the x-direction resonant frequency of the movable body and the y-direction resonant frequency thereof. This condition can be rewritten as "1 kHz≤$\Delta f$." A plurality of beat periods can be detected to improve the precision of the sensing operation.

In order to perform a sensing operation when the amplitude of a beat is large, one period (T=1/f) of vibration of frequency f has only to be close to the peak of the beat, wherein f is equal to $(f_x + f_y)/2$ ($f = (f_x + f_y)/2$, $f_x$ represents the x-direction resonant frequency, and $f_y$ represents the y-direction resonant frequency. Assuming that T is not larger than 10% of $t_1$ (T≤0.1×$t_1$), the condition of "5 kHz≤f" is obtained.

Furthermore, in order to perform a sensing operation when the amplitude of a beat is large, the vibration of the movable body needs to attenuate considerably more slowly. FIG. 12 is a chart showing a condition under which the vibration needs to attenuate considerably more slowly. If the amount of attenuation in one period t1 of a beat is not larger than 10% of the case where the vibration does not attenuate, the condition "$0.2/t_1 \geq \gamma_x$" is obtained. If $t_1$ is equal to 2 msec ($t_1$=2 msec), the condition "100 Hz≥$\gamma_x$" is obtained. If this condition is represented by the Q value on the assumption that f is equal to 5 kHz (f=5 kHz) and $\Delta f$ is equal to 1 kHz ($\Delta f$=1 kHz), the following is obtained: $Q = \omega_x/\gamma_x \geq 345$.

Figure 13:
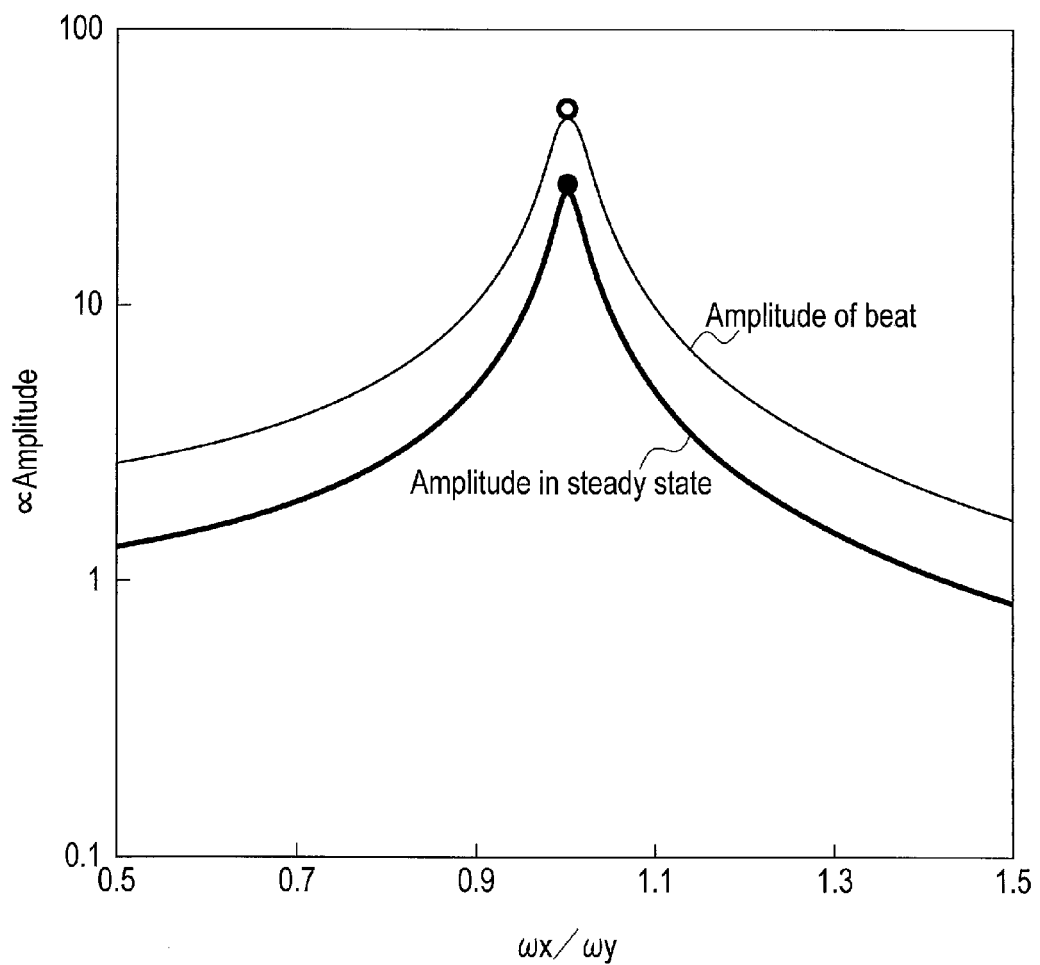
FIG. 13 is a graph showing a condition for making the amplitude of a beat larger than that in a steady state in the gyro sensor according to the embodiment.

FIG. 13 is a graph showing a condition for making the amplitude of a beat larger than that in a steady state. In order to make the amplitude of a beat larger than that in a steady state, the following equation has only to be satisfied:

$$1 - \sqrt{3}\gamma/2 < \omega_x/\omega_y < 1 + \sqrt{3}\gamma/2$$

The timing at which the movable body stops vibrating will be described below.

As has been described, in this embodiment, power consumption is decreased by stopping the vibration after a sensing operation is completed. The timing at which the vibration stops is timing at which a beat disappears. As described above, the amplitude of a beat attenuates according to "$\exp(-\gamma_x t/2)$."

Assuming here that the vibration stops before the amplitude of a beat attenuates to 1/10, $\exp(-\gamma_x t/2)$ becomes equal to or greater than 0.1 ($\exp(-\gamma_x t/2 \geq 0.1$) and the timing at which the vibration stops is expressed by "t≤2 log 10/$\gamma$x=4.6/$\gamma$x." If it is rewritten using the Q value ($Q_x = \omega_x/\gamma_x$), the timing at which the vibration stops is expressed by "t≤4.6 $Q_x/\omega_x$."

FIG. 14A is a timing chart showing timing at which the movable body stops vibrating. The sensing operation is carried out at a period of the reciprocal (Ts1=1/ODR) of the output data rate (ODR). For example, when ODR is equal to 100 Hz (ODR=100 Hz), Ts1 is equal to 10 msec (Ts1=10 msec). The movable body continues to vibrate only for a period of Ts2 included in a period of Ts1. In other words, a period Ts2 for which the movable body continues to vibrate in the y direction is shorter than a period Ts1 corresponding to the reciprocal of the output data rate (ODR) of the gyro sensor. In this embodiment, when the starting position of the vibration is "y=y0" (e.g., the position of the initial state shown in FIG. 5A), it is efficient in terms of energy that the stopping position of the vibration is also "y=y0." Thus, the equation "$\omega_2 \times Ts2 = n\pi$" (n is a natural number) has only to be satisfied; accordingly, the equation "Ts2=$n\pi/\omega_2$" has only to be satisfied. Actually, even though the equation "Ts2=$n\pi/\omega_2$" need not strictly be satisfied, the movable body has only to stop when it is located close to the position "y=y0." In this case, Ts2 has only to satisfy the following equation.

$$\frac{\left(n - \frac{1}{4}\right)\pi}{\omega_2} \leq T_{s2} \leq \frac{\left(n + \frac{1}{4}\right)\pi}{\omega_2}$$

FIG. 14B is a chart showing a comparative example (prior art) relative to FIG. 14A. In this comparative example, a movable body does not stop but continues to vibrate; thus, power consumption increases.

FIG. 15A is a plan view schematically showing an example of a structure in which the gyro sensor according to this embodiment is formed on a semiconductor substrate. FIG. 15B is a cross-sectional view taken along line A-A of FIG. 15A.

As shown in FIGS. 15A and 15B, a gyro sensor 120 is formed using MEMS technology on a ground region 110 including a semiconductor substrate 111, an insulation region 112, a transistor 113 and an interconnection 114. The gyro sensor 120 is covered with a cap film (protection film) 130. The gyro sensor 120 includes an x-direction movable portion 11x, a y-direction movable portion 11y, a spring portion 14, a fixed electrode portion 15 and the like. The cap film 130 is formed of three insulation layers and a cavity is formed therein. To decrease the attenuation coefficient of the vibration, it is favorable that the cavity in the cap film 130 should be in a vacuum state.

In the structure shown in FIGS. 15A and 15B, the gyro sensor 120 is provided on one chip on which an integrated circuit including the transistor 113 and interconnection 114 is formed; however, the gyro sensor 120 and the integrated circuit can be provided on different chips.

Figure 16:
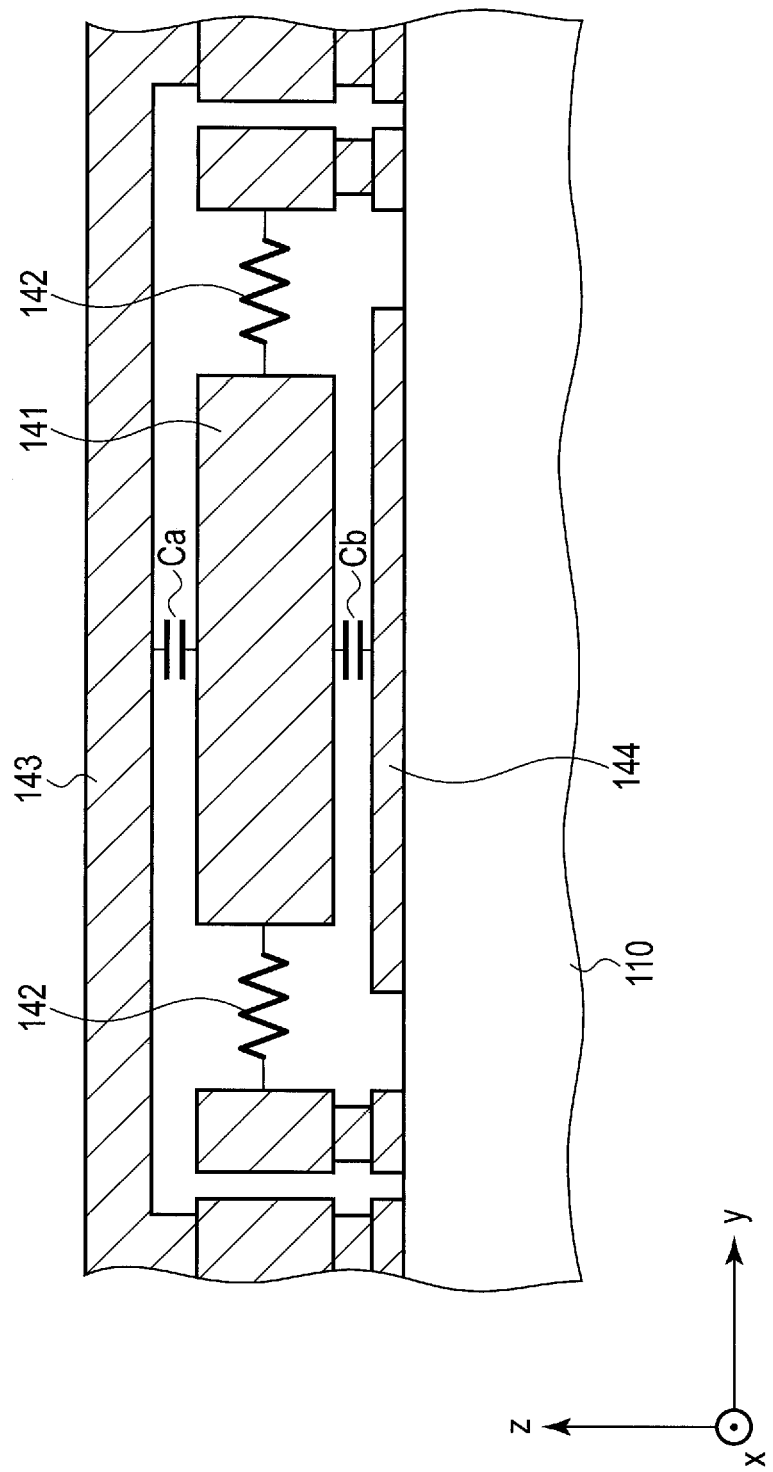
FIG. 16 is a cross-sectional view schematically showing another example of a structure in which the gyro sensor according to the embodiment is formed on a semiconductor substrate.

FIG. 16 is a cross-sectional view schematically showing another example of a structure in which the gyro sensor according to this embodiment is formed on a semiconductor substrate.

Like in the structure of FIGS. 15A and 15B, in the structure shown in FIG. 16, the gyro sensor is formed on the ground region 110 using MEMS technology. A spring portion 142 is provided at either end of a movable body (movable portion) 141, an upper electrode 143 is provided above the movable body 141, and a lower electrode 144 is provided under the movable body 141.

When the movable body 141 is vibrated in the y-axis direction while rotating around the x axis, the Coriolis force is applied in the z-axis direction. The amplitude of vibration by the Coriolis force can be obtained on the basis of differential capacitance (Ca−Cb) between capacitance Ca between the movable body 141 and the upper electrode 143 and capacitance Cb between the movable body 141 and the lower electrode 144.

When the movable body 141 rotates around the y axis, if the x-axis direction is defined as a driving direction (vibrating direction), the Coriolis force is applied in the z-axis direction. Therefore, in this case, too, the amplitude of the vibration by the Coriolis force can be obtained on the basis of the foregoing differential capacitance (Ca−Cb).

The method according to the above-described embodiment can be applied to a gyro sensor for sensing the angular velocity in the directions of three axes (x, y and z axes).

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A method of acquiring rotational information of a gyro sensor, comprising:
   starting a vibration in a first direction of a movable body by releasing the movable body from a vibration stopping portion;
   sensing a predetermined physical quantity which depends upon an amplitude of a vibration in a second direction different from the first direction;
   calculating rotational information of the movable body based on the sensed predetermined physical quantity; and
   stopping the vibration in the first direction of the movable body by catching the movable body by the vibration stopping portion after the predetermined physical quantity is sensed,
   wherein the catching the movable body is performed by applying an electrostatic force between the movable body and an electrode.

2. The method of claim 1, wherein the predetermined physical quantity is based on capacitance between a fixed electrode portion and a movable electrode portion included in the movable body.

3. The method of claim 1, wherein the predetermined physical quantity is sensed when the vibration in the second direction is in a non-steady state.

4. The method of claim 3, wherein the vibration in the first direction of the movable body is stopped before the vibration in the second direction reaches a steady state.

5. The method of claim 1, wherein the vibration in the first direction of the movable body is stopped by catching the movable body when an amplitude of the vibration in the first direction reaches a peak.

6. The method of claim 1, wherein the vibration in the first direction of the movable body is stopped by catching the movable body using a stopper.

7. The method of claim 1, wherein the releasing the movable body is performed by reducing the electrostatic force between the movable body and the electrode.

8. The method of claim 1, wherein a forced vibration in the first direction is not applied to the movable body after the movable body starts to vibrate in the first direction.

9. The method of claim 1, wherein after a forced vibration in the first direction is applied to the movable body for a fixed period of time, the forced vibration to the movable body is stopped.

10. The method of claim 1, wherein a resonant frequency in the first direction of the movable body and a resonant frequency in the second direction of the movable body are different from each other.

11. The method of claim 1, wherein the rotational information is calculated based on the predetermined physical quantity sensed when the amplitude of the vibration in the second direction of the movable body reaches a peak.

12. The method of claim 1, wherein the rotational information is calculated based on the predetermined physical quantity sensed at a specific timing after the movable body starts to vibrate in the first direction.

13. The method of claim 1, wherein the movable body starts to vibrate in the first direction from a state in which the movable body is displaced forcibly in the first direction.

14. The method of claim 1, wherein the vibration in the second direction is based on Coriolis force that is applied to the movable body which is vibrating in the first direction.

15. The method of claim 1, wherein the vibration in the first direction is a free vibration.

16. A device which acquires rotational information of a gyro sensor, comprising:
   a sensing unit which senses a predetermined physical quantity which depends upon an amplitude of a vibration in a second direction of a movable body which is vibrating in a first direction;
   a rotational information calculating unit which calculates rotational information of the movable body based on the predetermined physical quantity sensed by the sensing unit; and
   a vibration stopping portion which stops a vibration in the first direction of the movable body by catching the movable body,
   wherein the vibration in the first direction of the movable body is started by releasing the movable body from the vibration stopping portion,
   wherein the second direction is different from the first direction, and wherein the catching the movable body is performed by the vibration stopping portion by applying an electrostatic force between the movable body and an electrode.

17. The device of claim 16, wherein the predetermined physical quantity is based on capacitance between a fixed electrode portion and a movable electrode portion included in the movable body.

18. The device of claim 16, wherein the vibration stopping portion stops the vibration in the first direction of the movable body after the predetermined physical quantity is sensed.

19. The device of claim 16, wherein the predetermined physical quantity is sensed when the vibration in the second direction is in a non-steady state.

20. The device of claim 19, wherein the vibration stopping portion stops the vibration in the first direction of the movable body before the vibration in the second direction reaches a steady state.

21. The device of claim 16, wherein a resonant frequency in the first direction of the movable body and a resonant frequency in the second direction of the movable body are different from each other.

22. The device of claim 16, wherein the rotational information calculating unit calculates the rotational information based on the predetermined physical quantity sensed when the amplitude of the vibration in the second direction of the movable body reaches a peak.

23. The device of claim 16, wherein the rotational information calculating unit calculates the rotational information based on the predetermined physical quantity sensed at a specific timing after the movable body starts to vibrate in the first direction.

24. The device of claim 16, wherein the vibration stopping portion stops the vibration in the first direction of the movable body by catching the movable body when an amplitude of the vibration in the first direction reaches a peak.

25. The device of claim 16, wherein the vibration stopping portion stops the vibration in the first direction of the movable body by catching the movable body using a stopper.

26. The device of claim 16, wherein the vibration stopping portion stops the vibration in the first direction of the movable body by applying the electrostatic force between a projecting portion of the movable body and a drive electrode located near the projecting portion so as to cause the projecting portion to be in contact with the vibration stopping portion.

27. The device of claim 16, wherein the releasing the movable body is performed by reducing the electrostatic force between the movable body and an electrode.

28. The device of claim 16, wherein the vibration in the second direction is based on Coriolis force that is applied to the movable body which is vibrating in the first direction.

29. The device of claim 16, wherein the vibration in the first direction is a free vibration.

30. A method of acquiring rotational information of a gyro sensor, comprising:

sensing a predetermined physical quantity which depends upon an amplitude of a vibration in a second direction of a movable body which is vibrating in a first direction;

calculating rotational information of the movable body based on the sensed predetermined physical quantity; and stopping a vibration in the first direction of the movable body after the predetermined physical quantity is sensed, wherein the vibration in the first direction of the movable body is stopped by catching the movable body, and wherein the catching the movable body is performed by applying an electrostatic force between the movable body and an electrode.

31. The method of claim 30, further comprising starting a vibration in the first direction of the movable body by releasing the movable body, wherein releasing the movable body is performed by reducing the electrostatic force between the movable body and the electrode.

32. The method of claim 30, wherein the vibration in the second direction is based on Coriolis force that is applied to the movable body which is vibrating in the first direction.

33. The method of claim 30, wherein the vibration in the first direction is a free vibration.

34. A device which acquires rotational information of a gyro sensor, comprising:

a sensing unit which senses a predetermined physical quantity which depends upon an amplitude of a vibration in a second direction of a movable body which is vibrating in a first direction;

a rotational information calculating unit which calculates rotational information of the movable body based on the predetermined physical quantity sensed by the sensing unit; and a vibration stopping portion which stops a vibration in the first direction of the movable body by catching the movable body, wherein the catching the movable body is performed by the vibration stopping portion by applying an electrostatic force between the movable body and an electrode.

35. The device of claim 34, wherein the vibration in the first direction of the movable body is started by releasing the movable body from the vibration stopping portion, and wherein the releasing the movable body is performed by reducing the electrostatic force between the movable body and the electrode.

36. The device of claim 34, wherein the vibration in the second direction is based on Coriolis force that is applied to the movable body which is vibrating in the first direction.

37. The device of claim 34, wherein the vibration in the first direction is a free vibration.

* * * * *